US009140878B2

(12) United States Patent
Chen

(10) Patent No.: US 9,140,878 B2
(45) Date of Patent: Sep. 22, 2015

(54) PHOTOGRAPHING LENS ASSEMBLY AND IMAGE CAPTURING DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 106 days.

(21) Appl. No.: 14/045,800

(22) Filed: Oct. 4, 2013

(65) Prior Publication Data

US 2015/0085183 A1    Mar. 26, 2015

(30) Foreign Application Priority Data

Sep. 25, 2013  (TW) .............. 102134578 U

(51) Int. Cl.
*G02B 13/00* (2006.01)
*G02B 9/62* (2006.01)

(52) U.S. Cl.
CPC .............. *G02B 13/0045* (2013.01); *G02B 9/62* (2013.01)

(58) Field of Classification Search
CPC ........ G02B 9/62; G02B 9/64; G02B 13/0045; G02B 9/14; G02B 3/04
USPC ........................................ 359/713, 756–762
See application file for complete search history.

(56) References Cited

U.S. PATENT DOCUMENTS

| 2013/0342918 | A1 | 12/2013 | Kubota et al. |
| 2014/0063323 | A1* | 3/2014 | Yamazaki et al. ............. 348/335 |
| 2014/0078603 | A1* | 3/2014 | You ................................ 359/738 |
| 2014/0153117 | A1 | 6/2014 | Hagiwara |
| 2014/0327807 | A1 | 11/2014 | Chen et al. |
| 2014/0327808 | A1 | 11/2014 | Chen et al. |
| 2014/0347745 | A1 | 11/2014 | Shinohara |

FOREIGN PATENT DOCUMENTS

JP          2014232147 A     12/2014

* cited by examiner

*Primary Examiner* — Scott J Sugarman
*Assistant Examiner* — Journey Sumlar
(74) *Attorney, Agent, or Firm* — CKC & Partners Co., Ltd.

(57) ABSTRACT

A photographing lens assembly includes, in order from an object side to an image side, a first lens element, a second lens element, a third lens element, a fourth lens element, a fifth lens element, and a sixth lens element. The first lens element has positive refractive power. The second lens element has refractive power. The third lens element has positive refractive power. The fourth lens element with refractive power has an object-side surface being concave in a paraxial region thereof. The fifth lens element with positive refractive power has an object-side surface being convex in a paraxial region thereof and an image-side surface being convex in a paraxial region thereof. The sixth lens element with refractive power has an image-side surface being concave in a paraxial region thereof. The photographing lens assembly has a total of six lens elements with refractive power.

24 Claims, 17 Drawing Sheets

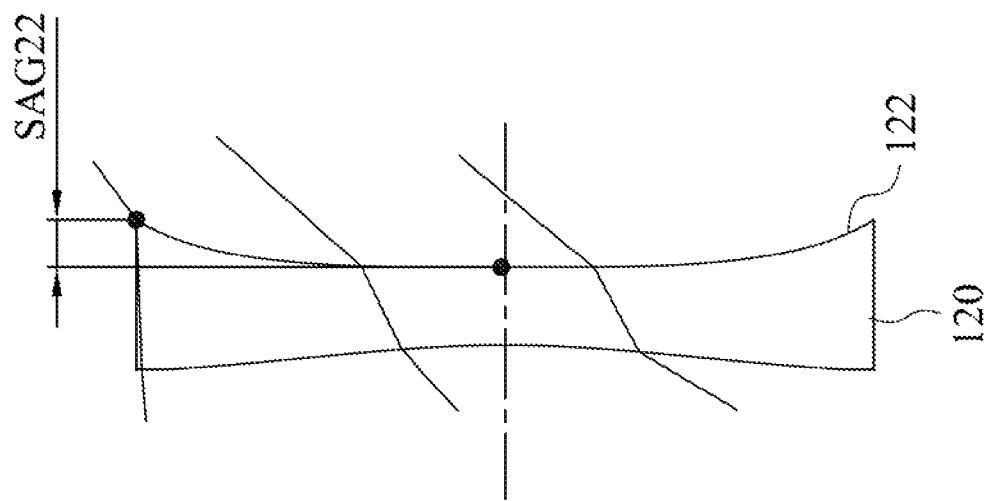

PHOTOGRAPHING LENS ASSEMBLY AND IMAGE CAPTURING DEVICE

RELATED APPLICATIONS

This application claims priority to Taiwan Application Serial Number 102134578, filed Sep. 25, 2013, which is incorporated by reference herein in its entirety.

BACKGROUND

1. Technical Field

The present disclosure relates to a photographing lens assembly. More particularly, the present disclosure relates to a compact photographing lens assembly applicable to electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the surface shape of the second lens element is excessively curved, so that it provides unfavorable moldability for plastic lens elements during the injection molding process. It also tends to result in a rather small distance between the peripheral regions of the second lens element and the third lens element. Accordingly, it is not applicable to the portable and compact electronic products with high image quality.

SUMMARY

According to one aspect of the present disclosure, a photographing lens assembly includes, in order from an object side to an image side, a first lens element, a second lens element, a third lens element, a fourth lens element, a fifth lens element, and a sixth lens element. The first lens element has positive refractive power. The second lens element has refractive power. The third lens element has positive refractive power. The fourth lens element with refractive power has an object-side surface being concave in a paraxial region thereof. The fifth lens element with positive refractive power has an object-side surface being convex in a paraxial region thereof and an image-side surface being convex in a paraxial region thereof. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are aspheric. The photographing lens assembly has a total of six lens elements with refractive power. When a focal length of the photographing lens assembly is f, and a curvature radius of an image-side surface of the second lens element is R4, the following condition is satisfied:

$-1.0 < f/R4 \leq 0$.

According to another aspect of the present disclosure, an image capturing device includes the photographing lens assembly according to the aforementioned aspect and an image sensor, wherein the image sensor is located on an image plane of the photographing lens assembly.

According to still another aspect of the present disclosure, a photographing lens assembly includes, in order from an object side to an image side, a first lens element, a second lens element, a third lens element, a fourth lens element, a fifth lens element, and a sixth lens element. The first lens element has positive refractive power. The second lens element has refractive power. The third lens element has positive refractive power. The fourth lens element has refractive power. The fifth lens element with positive refractive power has an object-side surface being convex in a paraxial region thereof and an image-side surface being convex in a paraxial region thereof. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are aspheric. The photographing lens assembly has a total of six lens elements with refractive power. When a focal length of the photographing lens assembly is f, a curvature radius of an image-side surface of the second lens element is R4, a central thickness of the third lens element is CT3, and a central thickness of the fourth lens element is CT4, the following conditions are satisfied:

$-1.0 < f/R4 \leq 0$; and $0.9 < CT3/CT4 < 5.0$.

According to yet another aspect of the present disclosure, an image capturing device includes the photographing lens assembly according to the still another aspect and an image sensor, wherein the image sensor is located on an image plane of the photographing lens assembly.

BRIEF DESCRIPTION OF THE DRAWINGS

The disclosure can be more fully understood by reading the following detailed description of the embodiments, with reference made to the accompanying drawings as follows:

FIG. 17 shows SAG22 of an image-side surface of a second lens element according to a photographing lens assembly of the 1st embodiment.

DETAILED DESCRIPTION

Figure 1:
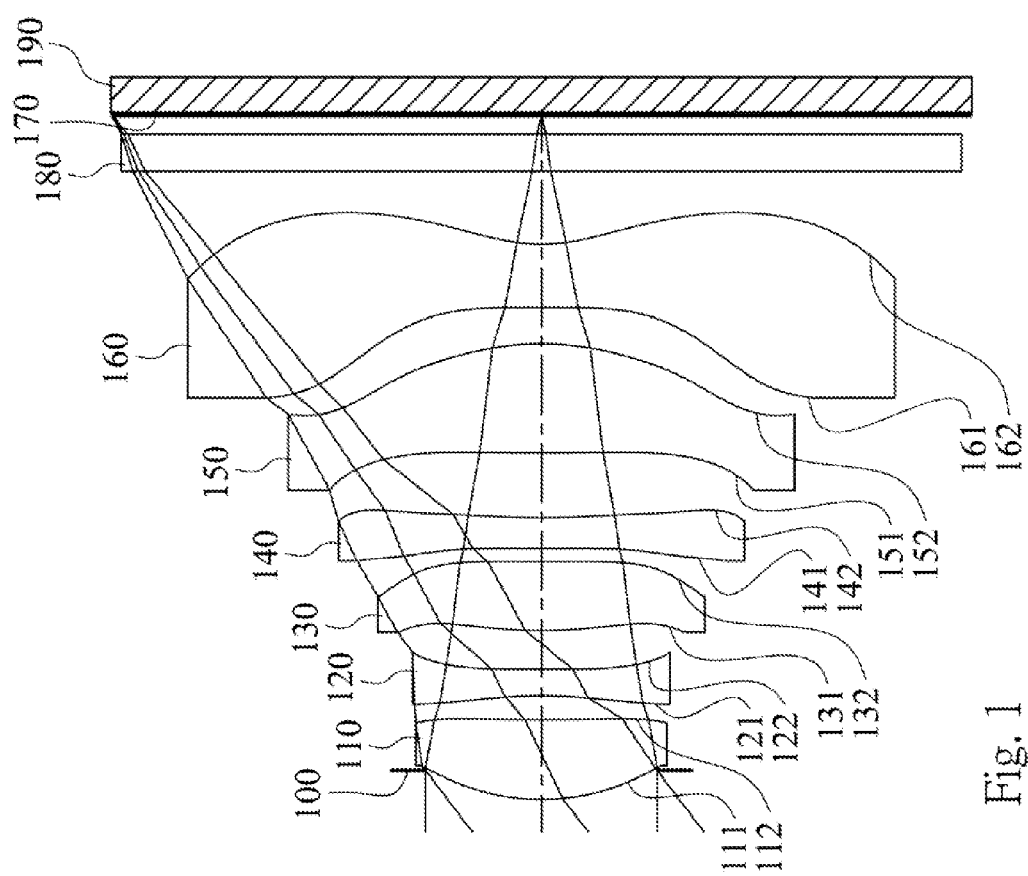
FIG. 1 is a schematic view of an image capturing device according to the 1st embodiment of the present disclosure.

A photographing lens assembly includes, in order from an object side to an image side, a first lens element, a second lens element, a third lens element, a fourth lens element, a fifth lens element, and a sixth lens element. The photographing lens assembly has a total of six lens elements with refractive power.

The first lens element has positive refractive power, so that the total track length of the photographing lens assembly can be reduced by properly adjusting the positive refractive power of the first lens element.

The second lens element can have negative refractive power and an object-side surface being concave in a paraxial region thereof. Therefore, it is favorable for correcting the aberration of the first lens element.

The third lens element with positive refractive power can have an object-side surface being convex in a paraxial region thereof, wherein the object-side surface of the third lens element can have at least one concave shape in an off-axis region thereof. Therefore, it is favorable for reducing the sensitivity of the photographing lens assembly and effectively reducing the incident angle of the light projecting onto an image sensor so as to increase the responding efficiency of the image sensor.

The fourth lens element can have negative refractive power and an object-side surface being concave in a paraxial region thereof. Therefore, the aberration can be further corrected.

The fifth lens element with positive refractive power has an object-side surface being convex in a paraxial region thereof and an image-side surface being convex in a paraxial region thereof. Therefore, it is favorable for reducing spherical aberration.

The sixth lens element has an image-side surface being concave in a paraxial region thereof, wherein the image-side surface of the sixth lens element has at least one convex shape in an off-axis region thereof. Therefore, the principal point of the photographing lens assembly can be positioned away from an image plane, and the back focal length thereof can be reduced so as to correct the aberration of the off-axis.

When a focal length of the photographing lens assembly is f, and a curvature radius of an image-side surface of the second lens element is R4, the following condition is satisfied: $-1.0 < f/R4 \leq 0$. Therefore, the surface shape of the second lens element is favorable for molding the second lens element and arranging the lens elements of the photographing lens assembly so as to prevent the distance between the peripheral regions of the second lens element and the third lens element from becoming too small and to further improve the image quality of the photographing lens assembly.

When a curvature radius of an object-side surface of the first lens element is R1, and the focal length of the photographing lens assembly is f, the following condition is satisfied: $0.25 < R1/f < 1.0$. Therefore, it is favorable for reducing the total track length of the photographing lens assembly.

When a curvature radius of an object-side surface of the sixth lens element is R11, and a curvature radius of the image-side surface of the sixth lens element is R12, the following condition is satisfied: $0 < (R11+R12)/(R11-R12) < 2.0$. Therefore, it is favorable for reducing the back focal length so as to keep the photographing lens assembly compact.

When a central thickness of the third lens element is CT3, and a central thickness of the fourth lens element is CT4, the following condition is satisfied: $0.9 < CT3/CT4 < 5.0$. Therefore, it provides favorable moldability and homogeneity for plastic lens elements during the injection molding process. Preferably, the following condition is satisfied: $1.0 < CT3/CT4 < 3.0$.

When a curvature radius of the object-side surface of the fifth lens element is R9, and a curvature radius of the image-side surface of the fifth lens element is R10, the following condition is satisfied: $0.2 < (R9+R10)/(R9-R10) < 1.0$. Therefore, it is favorable for reducing the spherical aberration.

When a focal length of the third lens element is f3, and a focal length of the fourth lens element is f4, the following condition is satisfied: $0 < f3/|f4| < 0.75$. Therefore, it is favorable for balancing the refractive powers of the photographing lens assembly so as to reduce the aberration.

When a distance in parallel with an optical axis from an axial vertex on the image-side surface of the second lens element to a maximum effective diameter position on the image-side surface of the second lens element is SAG22 (When the distance towards the object side of the photographing lens assembly, the SAG22 is negative, and when the distance towards the image side of the photographing lens assembly, the SAG22 is positive.), and a central thickness of the second lens element is CT2, the following condition is satisfied: $-0.5 < SAG22/CT2 < 1.0$. Therefore, it is favorable for manufacturing and assembling the lens elements so as to keep the photographing lens assembly more compact.

When a maximum image height of the photographing lens assembly (half of a diagonal length of an effective photosensitive area of the image sensor) is ImgH, and an axial distance between the object-side surface of the first lens element and the image plane is TL, the following condition is satisfied: $TL/ImgH < 2.0$. Therefore, it is favorable for reducing the total track length of the photographing lens assembly so as to keep the photographing lens assembly compact.

When the focal length of the photographing lens assembly is f, and the focal length of the third lens element is f3, the following condition is satisfied: $0.3 < f/f3$. Therefore, it is favorable for reducing the sensitivity of the photographing lens assembly. Preferably, the following condition is satisfied: $0.4 < f/f3 < 1.2$.

When a central thickness of the sixth lens element is CT6, and an axial distance between the fifth lens element and the sixth lens element is T56, the following condition is satisfied: 0.75<CT6/T56<3.0. Therefore, it is favorable for assembling the lens elements of the photographing lens assembly so as to keep a compact size thereof.

According to the photographing lens assembly of the present disclosure, at least one of the object-side surface and the image-side surface of each of the second through the fifth lens elements has at least one inflection point in an off-axis region thereof. Therefore, it is favorable for further correcting the aberration of the off-axis.

When an f-number of the photographing lens assembly is Fno, the following condition is satisfied: 1.5<Fno<2.6. Therefore, it is favorable for obtaining a large aperture.

According to the photographing lens assembly of the present disclosure, the lens elements thereof can be made of glass or plastic material. When the lens elements are made of glass material, the distribution of the refractive power of the photographing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens assembly can also be reduced.

According to the photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the photographing lens assembly of the present disclosure, the photographing lens assembly can include at least one stop, such as an aperture stop, a glare stop or a field stop. Said glare stop or said field stop is for eliminating the stray light and thereby improving the image resolution thereof.

According to the photographing lens assembly of the present disclosure, an aperture stop can be configured as a front stop or a middle stop. A front stop disposed between an imaged object and the first lens element can provide a longer distance between an exit pupil of the photographing lens assembly and the image plane and thereby improves the image-sensing efficiency of an image sensor. A middle stop disposed between the first lens element and the image plane is favorable for enlarging the field of view of the photographing lens assembly and thereby provides a wider field of view for the same.

According to the photographing lens assembly of the present disclosure, the photographing lens assembly is featured with good correction ability and high image quality, and can be applied to 3D (three-dimensional) image capturing applications, in products such as digital cameras, mobile devices, digital tablets, wearable devices and other portable electronic image systems.

According to the present disclosure, an image capturing device is provided. The image capturing device includes the photographing lens assembly according to the present disclosure, and an image sensor located on an image plane of the photographing lens assembly. Accordingly, the surface shape of the second lens element in the photographing lens assembly of the image capturing device is proper which is favorable for molding the second lens element. The surface shape of the second lens element is also favorable for arranging the lens elements of the photographing lens assembly so as to prevent the distance between the peripheral regions of the second lens element and the third lens element from becoming too small for improving the image quality of the image capturing device.

According to the above description of the present disclosure, the following 1st-8th specific embodiments are provided for further explanation.

1st Embodiment

Figure 2:
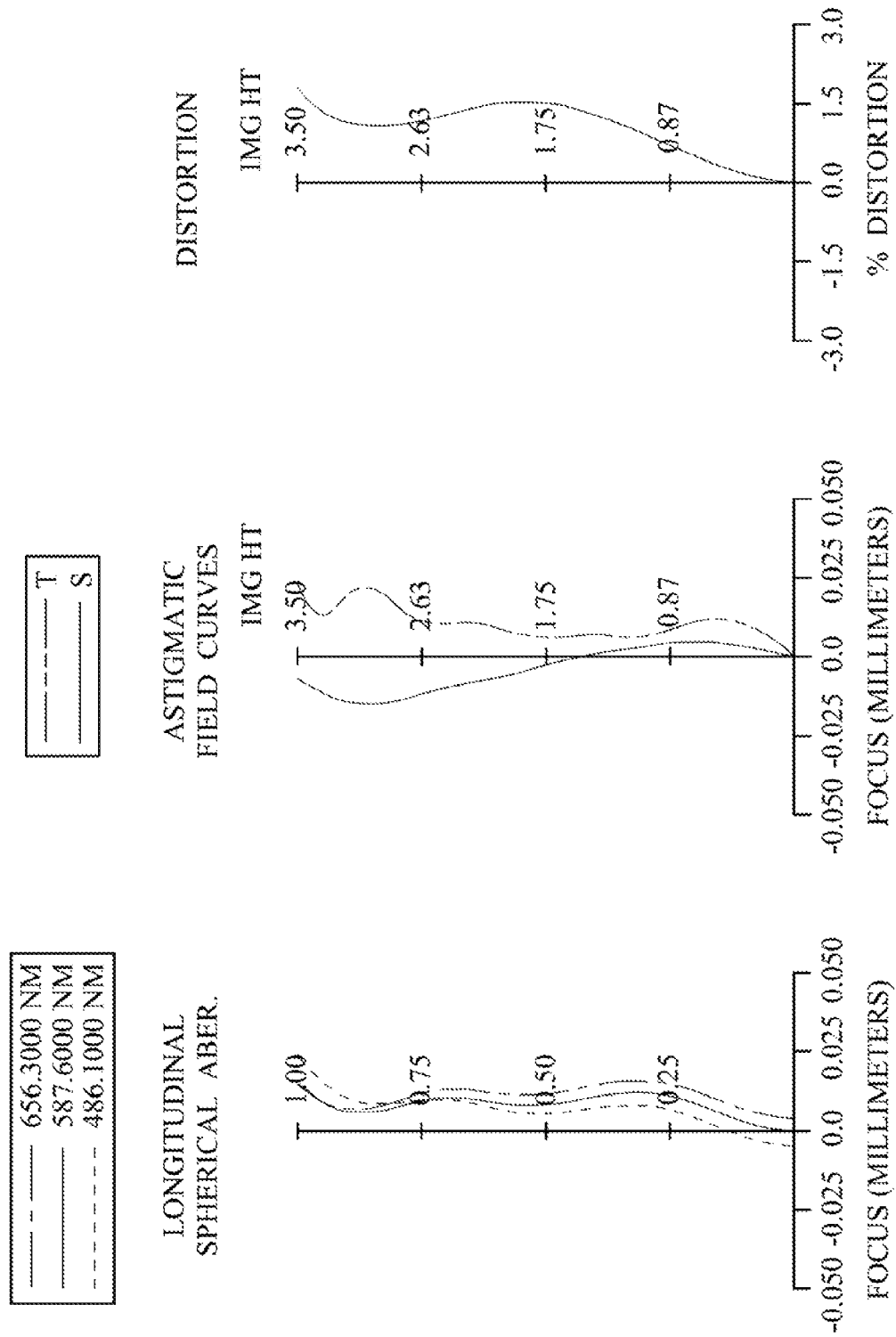
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing lens assembly (not otherwise herein labeled) and an image sensor 190. The photographing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170, wherein the image sensor 190 is disposed on the image plane 170. The photographing lens assembly has a total of six lens elements (110-160) with refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric, wherein both of the object-side surface 121 and the image-side surface 122 of the second lens element 120 have at least one inflection point in an off-axis region thereof.

The third lens element 130 with positive refractive power has an object-side surface 131 being convex in a paraxial region thereof and an image-side surface 132 being convex in a paraxial region thereof, wherein the object-side surface 131 of the third lens element 130 has at least one concave shape in an off-axis region thereof. The third lens element 130 is made of plastic material and has the object-side surface 131 and the image-side surface 132 being both aspheric, wherein the object-side surface 131 of the third lens element 130 has at least one inflection point in the off-axis region thereof.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric, wherein both of the object-side surface 141 and the image-side surface 142 of the fourth lens element 140 have at least one inflection point in an off-axis region thereof.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric, wherein both of the object-side surface 151 and the image-side surface 152 of the fifth lens element 150 have at least one inflection point in an off-axis region thereof.

The sixth lens element 160 with negative refractive power has an object-side surface 161 being convex in a paraxial region thereof and an image-side surface 162 being concave in a paraxial region thereof, wherein the image-side surface 162 of the sixth lens element 160 has at least one convex shape in an off-axis region thereof. The sixth lens element 160 is made of plastic material and has the object-side surface 161 and the image-side surface 162 being both aspheric.

The IR-cut filter 180 made of glass material is located between the sixth lens element 160 and the image plane 170, and will not affect a focal length of the photographing lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing lens assembly of the image capturing device according to the 1st embodiment, when a focal length of the photographing lens assembly is f, an f-number of the photographing lens assembly is Fno, and half of a maximal field of view of the photographing lens assembly is HFOV, these parameters have the following values: f=4.52 mm; Fno=2.40; and HFOV=37.2 degrees.

In the photographing lens assembly of the image capturing device according to the 1st embodiment, when the focal length of the photographing lens assembly is f, and a curvature radius of the object-side surface 111 of the to first lens element 110 is R1, the following condition is satisfied: R1/f=0.40.

In the photographing lens assembly of the image capturing device according to the 1st embodiment, when a central thickness of the third lens element 130 is CT3, a central thickness of the fourth lens element 140 is CT4, a central thickness of the sixth lens element 160 is CT6, and an axial distance between the fifth lens element 150 and the sixth lens element 160 is T56, the following conditions are satisfied: CT3/CT4=2.23; and CT6/T56=1.72.

In the photographing lens assembly of the image capturing device according to the 1st embodiment, when a focal length of the third lens element 130 is f3, and a focal length of the fourth lens element 140 is f4, the following condition is satisfied: f3/|f4|=0.52.

In the photographing lens assembly of the image capturing device according to the 1st embodiment, when a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following conditions are satisfied: (R9+R10)/(R9−R10)=0.95; and (R11+R12)/(R11−R12)=1.03.

In the photographing lens assembly of the image capturing device according to the 1st embodiment, when the focal length of the photographing lens assembly is f, and a focal length of the third lens element 130 is f3, the following condition is satisfied: f/f3=0.68.

In the photographing lens assembly of the image capturing device according to the 1st embodiment, when the focal length of the photographing to lens assembly is f, and a curvature radius of the image-side surface 122 of the second lens element 120 is R4, the following condition is satisfied: f/R4=−0.05.

FIG. 17 shows SAG22 of the image-side surface 122 of the second lens element 120 of the photographing lens assembly of the image capturing device according to the 1st embodiment. In FIG. 17, when a distance in parallel with is the optical axis from an axial vertex on the image-side surface 122 of the second lens element 120 to a maximum effective diameter position on the image-side surface 122 of the second lens element 120 is SAG22, and a central thickness of the second lens element 120 is CT2, the following condition is satisfied: SAG22/CT2=0.62.

In the photographing lens assembly according to the 1st embodiment, when an axial distance between the object-side surface 111 of the first lens element 110 and the image plane 170 is TL, and a maximum image height of the photographing lens assembly (half of a diagonal length of an effective photosensitive area of the image sensor 190) is ImgH, the following condition is satisfied: TL/ImgH=1.59.

The detailed optical data of the 1st embodiment are shown in Table 1, and the aspheric surface data are shown in Table 2 below.

TABLE 1

1st Embodiment
f = 4.52 mm, Fno = 2.40, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.236 | | | | |
| 2 | Lens 1 | 1.792 | ASP | 0.649 | Plastic | 1.535 | 56.3 | 3.60 |
| 3 | | 22.943 | ASP | 0.192 | | | | |

TABLE 1-continued

1st Embodiment
f = 4.52 mm, Fno = 2.40, HFOV = 37.2 deg.

| Surface # | | Curvature Radius | | Thickness | Material | Index | Abbe # | Focal Length |
|---|---|---|---|---|---|---|---|---|
| 4 | Lens 2 | −3.274 | ASP | 0.220 | Plastic | 1.634 | 23.8 | −5.35 |
| 5 | | −97.087 | ASP | 0.314 | | | | |
| 8 | Lens 3 | 3.666 | ASP | 0.558 | Plastic | 1.544 | 55.9 | 6.64 |
| 7 | | −245.103 | ASP | 0.112 | | | | |
| 8 | Lens 4 | −81.552 | ASP | 0.250 | Plastic | 1.514 | 56.8 | −12.72 |
| 9 | | 7.109 | ASP | 0.523 | | | | |
| 10 | Lens 5 | 82.855 | ASP | 0.889 | Plastic | 1.544 | 55.9 | 3.62 |
| 11 | | −2.008 | ASP | 0.297 | | | | |
| 12 | Lens 6 | 91.442 | ASP | 0.512 | Plastic | 1.535 | 55.7 | −2.55 |
| 13 | | 1.339 | ASP | 0.600 | | | | |
| 14 | IR-cut filter | Plano | | 0.300 | Glass | 1.517 | 64.2 | — |
| 15 | | Plano | | 0.161 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | −5.6564E+00 | −5.0000E+01 | −1.5465E+01 | 5.0000E+01 | 5.0673E+00 | 4.9004E+01 |
| A4 = | 1.1587E−01 | 3.7644E−04 | 1.1186E−01 | 1.5548E−01 | −5.9280E−02 | 2.9279E−02 |
| A6 = | −3.5365E−02 | −8.7269E−02 | −1.7953E−01 | −1.4039E−01 | −5.1247E−02 | −2.5622E−01 |
| A8 = | −5.9038E−02 | 2.5236E−01 | 3.7792E−01 | 2.2344E−01 | −1.1028E−03 | 2.6615E−01 |
| A10 = | 1.4288E−01 | −4.7318E−01 | −5.9078E−01 | −2.6142E−01 | 1.8197E−02 | −2.0434E−01 |
| A12 = | −1.3131E−01 | 3.7700E−01 | 4.6460E−01 | 1.8182E−01 | −3.5537E−02 | 1.1457E−01 |
| A14 = | 3.8890E−02 | −1.1141E−01 | −1.3342E−01 | −4.4893E−02 | 7.3018E−03 | −4.1213E−02 |
| A16 = | −3.2100E−04 | −4.0027E−04 | 8.5601E−05 | 4.3710E−04 | 6.7730E−03 | 7.2917E−03 |

| Surface # | 8 | 9 | 10 | 11 | 12 | 13 |
|---|---|---|---|---|---|---|
| k = | −6.3653E−01 | 2.7252E+00 | −5.0000E+01 | −1.2086E+01 | −5.0000E+01 | −5.9304E+00 |
| A4 = | 5.4399E−02 | 3.1879E−03 | 2.9029E−02 | −3.4427E−02 | −1.3958E−01 | −7.4389E−02 |
| A6 = | −3.7333E−01 | −2.0899E−01 | −6.9666E−02 | 1.3392E−02 | 1.9754E−02 | 2.5873E−02 |
| A8 = | 5.4109E−01 | 3.5737E−01 | 2.8061E−02 | −2.9317E−02 | −6.4746E−04 | −6.0326E−03 |
| A10 = | −4.0257E−01 | −2.7462E−01 | 4.9406E−04 | 1.9479E−02 | 2.9464E−03 | 8.4549E−04 |
| A12 = | 1.7873E−01 | 1.1209E−01 | −3.4547E−03 | −5.1450E−03 | −1.1344E−03 | −6.6901E−05 |
| A14 = | −4.5182E−02 | −2.3988E−02 | 8.2915E−04 | 6.0753E−04 | 1.5437E−04 | 2.4075E−06 |
| A16 = | 4.9187E−03 | 2.1058E−03 | −6.0789E−05 | −2.6823E−05 | −7.3713E−06 | −1.5117E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
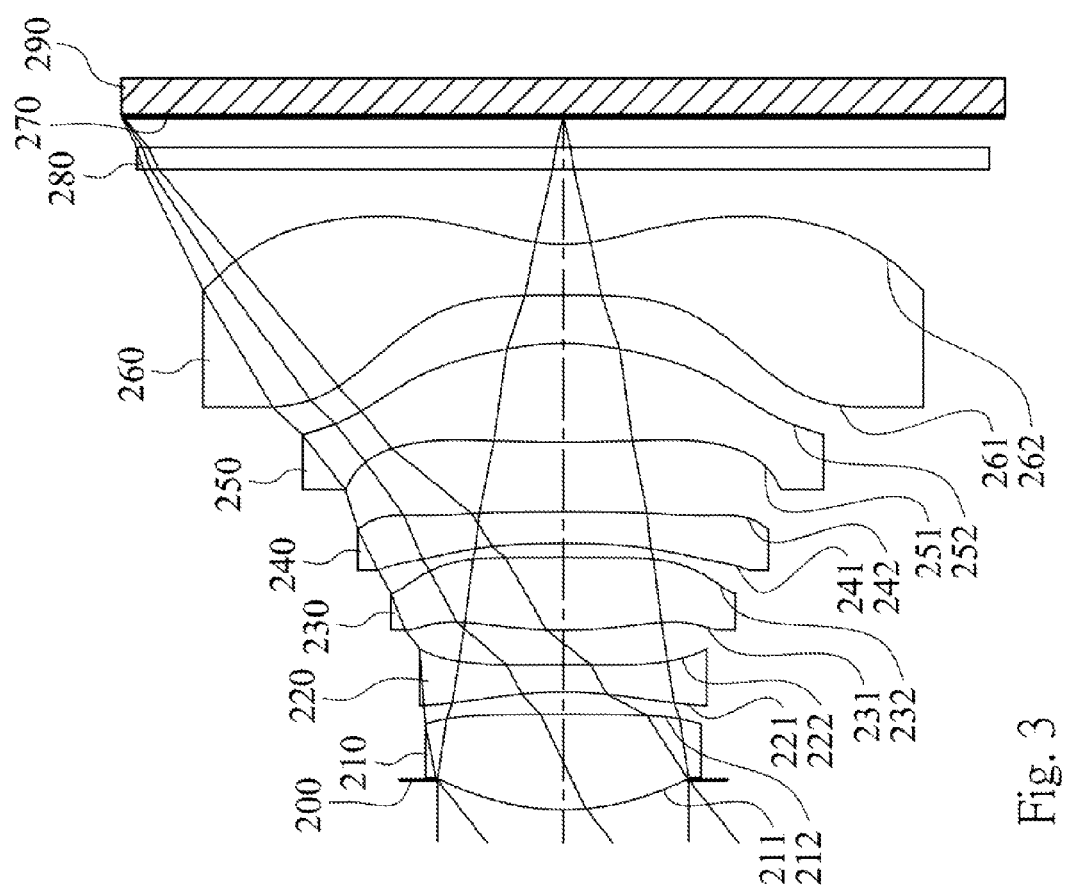
FIG. 3 is a schematic view of an image capturing device according to the 2nd embodiment of the present disclosure.
Figure 4:
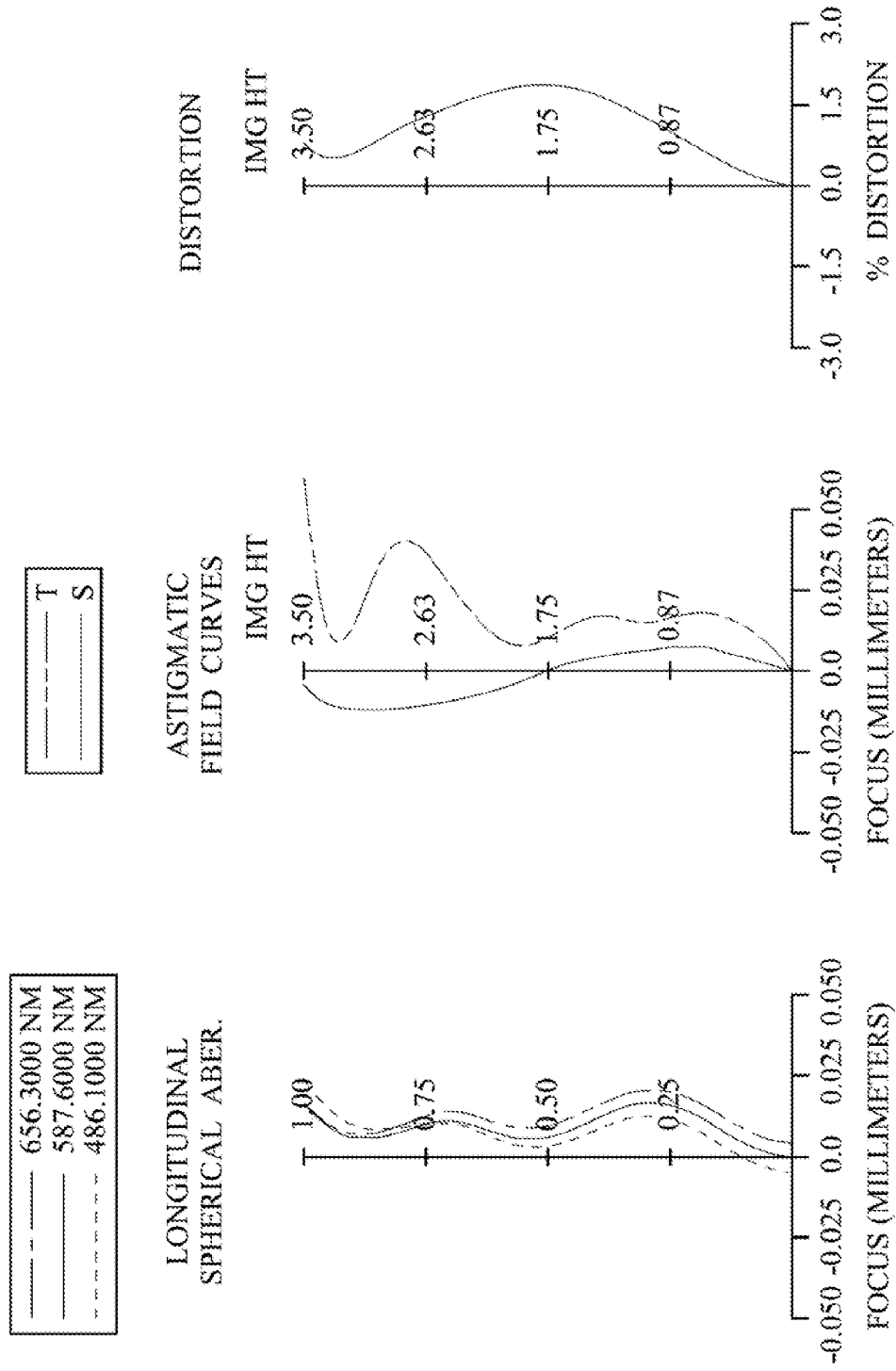
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing lens assembly (not otherwise herein labeled) and an image sensor 290. The photographing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280 and an image plane 270, wherein the image sensor 290 is disposed on the image plane 270. The photographing lens assembly has a total of six lens elements (210-260) with refractive power.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric, wherein both of the object-side surface 221 and the image-side surface 222 of the second lens element 220 have at least one inflection point in an off-axis region thereof.

The third lens element 230 with positive refractive power has an object-side surface 231 being convex in a paraxial region thereof and an image-side surface 232 being convex in a paraxial region thereof, wherein the object-side surface 231 of the third lens element 230 has at least one concave shape in an off-axis region thereof. The third lens element 230 is made of plastic material and has the object-side surface 231 and the image-side surface 232 being both aspheric, wherein the object-side surface 231 of the third lens element 230 has at least one inflection point in the off-axis region thereof.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric, wherein both of the object-side surface 241 and the image-side surface 242 of the fourth lens element 240 have at least one inflection point in an off-axis region thereof.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric, wherein both of the object-side surface 251 and the image-side surface 252 of the fifth lens element 250 have at least one inflection point in an off-axis region thereof.

The sixth lens element 260 with negative refractive power has an object-side surface 261 being concave in a paraxial region thereof and an image-side surface 262 being concave in a paraxial region thereof, wherein the image-side surface 262 of the sixth lens element 260 has at least one convex shape in an off-axis region thereof. The sixth lens element 260 is made of plastic material and has the object-side surface 261 and the image-side surface 262 being both aspheric.

The IR-cut filter 280 made of glass material is located between the sixth lens element 260 and the image plane 270, and will not affect a focal length of the photographing lens assembly.

The detailed optical data of the 2nd embodiment are shown in Table 3, and the aspheric surface data are shown in Table 4 below.

TABLE 3

2nd Embodiment
f = 4.39 mm, Fno = 2.20, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.236 | | | | |
| 2 | Lens 1 | 2.015 | ASP | 0.752 | Plastic | 1.544 | 55.9 | 3.65 |
| 3 | | −118.257 | ASP | 0.180 | | | | |
| 4 | Lens 2 | −2.748 | ASP | 0.220 | Plastic | 1.634 | 23.8 | −5.18 |
| 5 | | −17.284 | ASP | 0.275 | | | | |
| 6 | Lens 3 | 3.546 | ASP | 0.577 | Plastic | 1.544 | 55.9 | 6.21 |
| 7 | | −67.726 | ASP | 0.112 | | | | |
| 8 | Lens 4 | −6.325 | ASP | 0.250 | Plastic | 1.514 | 56.8 | −13.61 |
| 9 | | −67.347 | ASP | 0.555 | | | | |
| 10 | Lens 5 | 19.078 | ASP | 0.780 | Plastic | 1.544 | 55.9 | 3.40 |
| 11 | | −2.019 | ASP | 0.387 | | | | |
| 12 | Lens 6 | −31.699 | ASP | 0.400 | Plastic | 1.535 | 55.7 | −2.40 |
| 13 | | 1.341 | ASP | 0.600 | | | | |
| 14 | IR-cut filter | Plano | | 0.175 | Glass | 1.517 | 64.2 | — |
| 15 | | Plano | | 0.244 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | −7.7823E+00 | −5.0000E+01 | −1.0900E+01 | 4.9108E+01 | 5.0412E+00 | 4.9004E+01 |
| A4 = | 1.0652E−01 | −1.2934E−02 | 1.0062E−01 | 1.4651E−01 | −7.4384E−02 | 3.2992E−02 |
| A6 = | −4.1498E−02 | −8.3552E−02 | −1.7805E−01 | −1.4535E−01 | 5.5655E−02 | −2.1554E−01 |
| A8 = | −6.3156E−02 | 2.5422E−01 | 3.8804E−01 | 2.3206E−01 | −3.3528E−01 | 2.0599E−01 |
| A10 = | 1.4876E−01 | −4.6612E−01 | −5.9879E−01 | −2.7595E−01 | 6.2668E−01 | −1.6293E−01 |
| A12 = | −1.2940E−01 | 3.7524E−01 | 4.6371E−01 | 1.8352E−01 | −6.4876E−01 | 8.9810E−02 |
| A14 = | 3.8890E−02 | −1.1358E−01 | −1.3371E−01 | −4.5086E−02 | 3.2930E−01 | −2.9392E−02 |
| A16 = | −5.3050E−04 | 1.9301E−03 | 4.7173E−04 | −4.1336E−04 | −6.2101E−02 | 4.9109E−03 |

| Surface # | 8 | 9 | 10 | 11 | 12 | 13 |
|---|---|---|---|---|---|---|
| k = | −6.3653E−01 | 2.7252E+00 | −4.7164E+01 | −1.2086E+01 | −5.0000E+01 | −5.9304E+00 |
| A4 = | 9.5976E−02 | 3.5629E−02 | 4.3412E−02 | 1.6124E−03 | −1.4144E−01 | −9.2126E−02 |
| A6 = | −5.1087E−02 | −3.2158E−01 | −9.0935E−02 | −2.5836E−02 | 3.5527E−03 | 3.4337E−02 |
| A8 = | 8.8656E−01 | 5.6885E−01 | 3.6009E−02 | −1.1182E−02 | 1.0309E−02 | −8.3035E−03 |

TABLE 4-continued

| Aspheric Coefficients | | | | | | |
|---|---|---|---|---|---|---|
| A10 = | −8.1679E−01 | −4.5405E−01 | 3.4498E−03 | 1.4134E−02 | 3.8173E−05 | 1.2168E−03 |
| A12 = | 4.3333E−01 | 1.9143E−01 | −7.9970E−03 | −4.1759E−03 | −7.7098E−04 | −9.9202E−05 |
| A14 = | −1.2374E−01 | −4.2067E−02 | 2.6706E−03 | 5.1021E−04 | 1.3520E−04 | 3.2665E−06 |
| A16 = | 1.4568E−02 | 3.7877E−03 | −3.3024E−04 | −2.2765E−05 | −7.1542E−06 | 1.4715E−08 |

In the photographing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 4.39 | (R9 + R10)/(R9 − R10) | 0.81 |
| Fno | 2.20 | (R11 + R12)/(R11 − R12) | 0.92 |
| HFOV [deg.] | 38.3 | f/f3 | 0.71 |
| R1/f | 0.46 | f/R4 | −0.25 |
| CT3/CT4 | 2.31 | Sag22/CT2 | 0.57 |
| CT6/T56 | 1.03 | TL/ImgH | 1.57 |
| f3/|f4| | 0.46 | | |

3rd Embodiment

Figure 5:
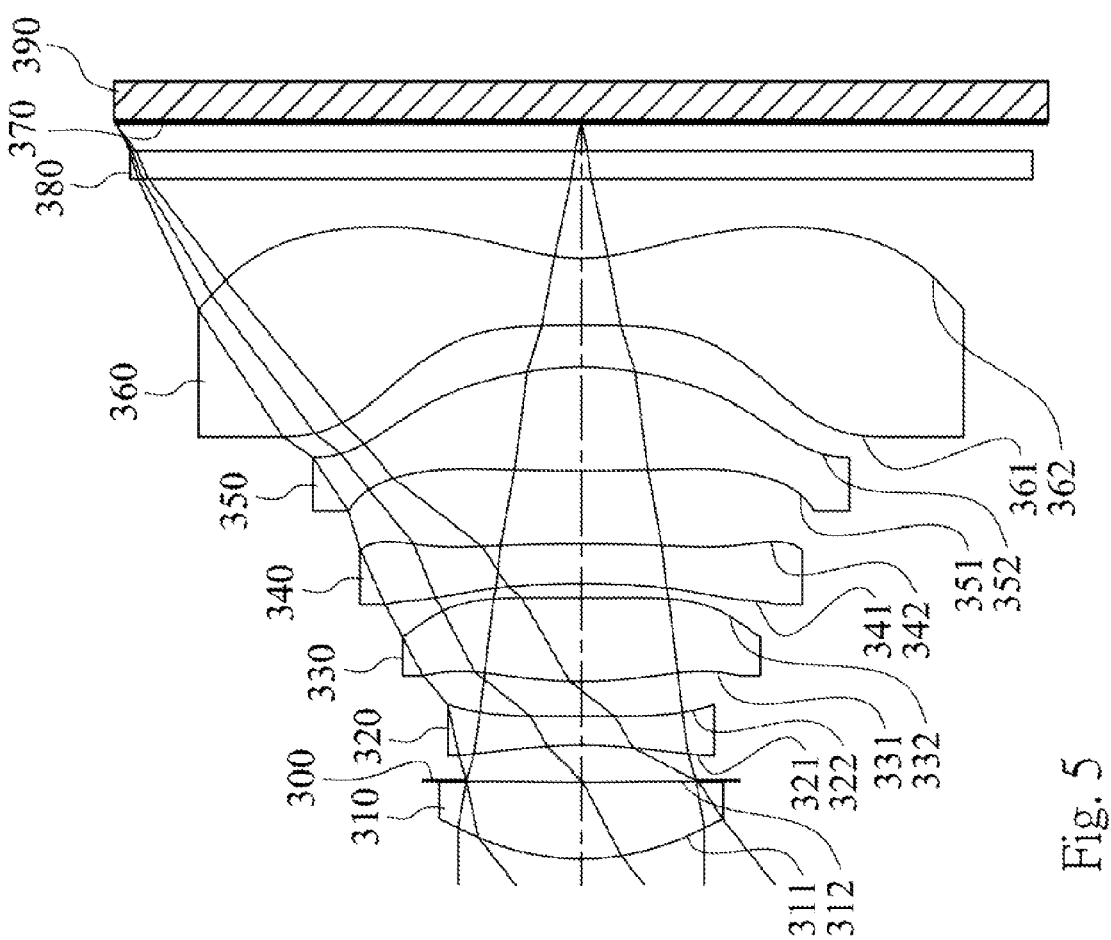
FIG. 5 is a schematic view of an image capturing device according to the 3rd embodiment of the present disclosure.
Figure 6:
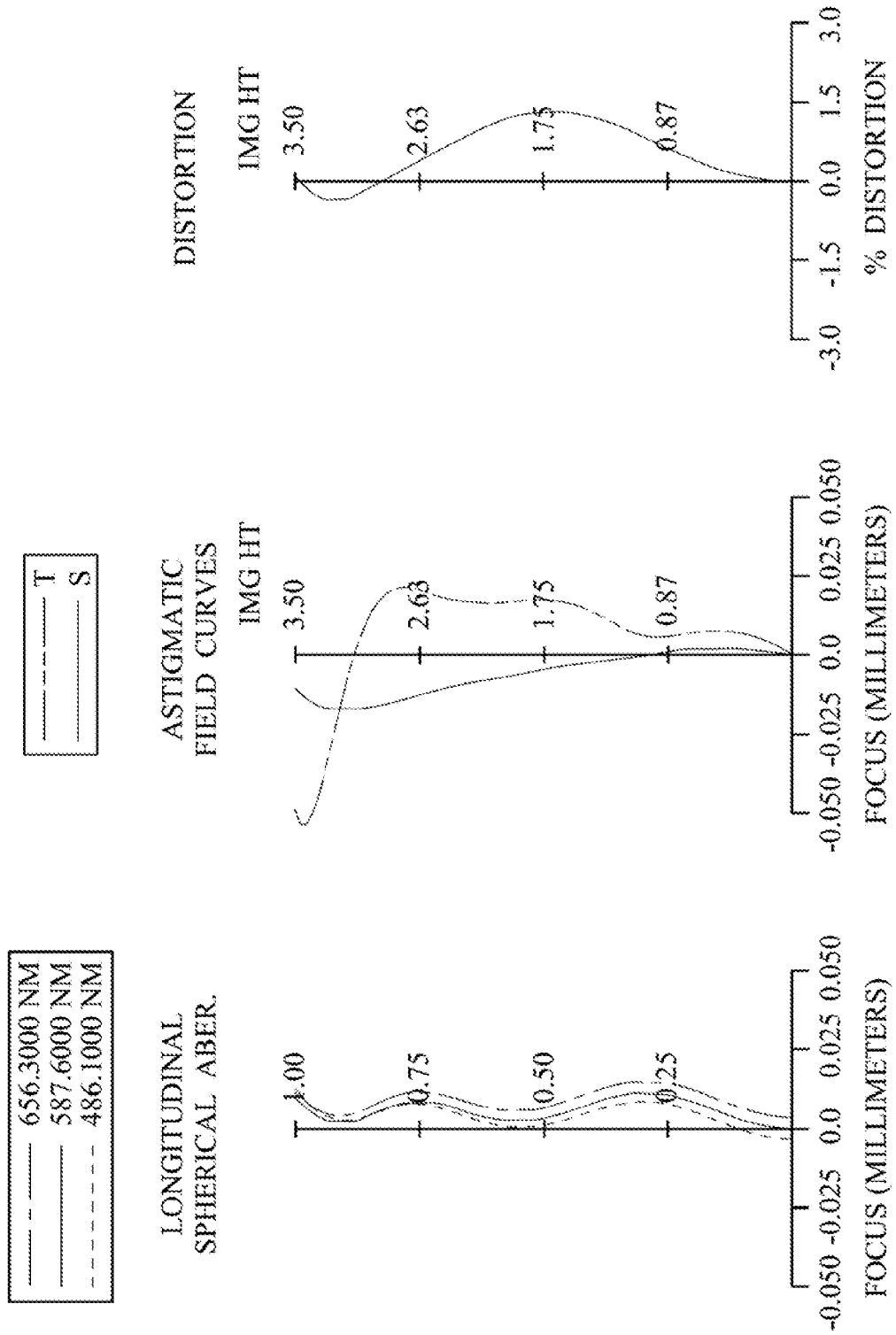
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration to curves, astigmatic field curves and a distortion curve of the image capturing device according to the 3rd embodiment. In FIG. 5, the image capturing device includes a photographing lens assembly (not otherwise herein labeled) and an image sensor 390. The photographing lens assembly includes, in order from an object side to an image side, a first lens element 310, an aperture stop 300, is a second lens element 320, a third lens element 330, a fourth lens element 340, a fifth lens element 350, a sixth lens element 360, an IR-cut filter 380 and an image plane 370, wherein the image sensor 390 is disposed on the image plane 370. The photographing lens assembly has a total of six lens elements (310-360) with refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric, wherein both of the object-side surface 321 and the image-side surface 322 of the second lens element 320 have at least one inflection point in an off-axis region thereof.

The third lens element 330 with positive refractive power has an object-side surface 331 being convex in a paraxial region thereof and an image-side surface 332 being concave in a paraxial region thereof, wherein the object-side surface 331 of the third lens element 330 has at least one concave shape in an off-axis region thereof. The third lens element 330 is made of plastic material and has the object-side surface 331 and the image-side surface 332 being both aspheric, wherein both of the object-side surface 331 and the image-side surface 332 of the third lens element 330 have at least one inflection point in the off-axis region thereof.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric, wherein both of the object-side surface 341 and the image-side surface 342 of the fourth lens element 340 have at least one inflection point in an off-axis region thereof.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric, wherein both of the object-side surface 351 and the image-side surface 352 of the fifth lens element 350 have at least one inflection point in an off-axis region thereof.

The sixth lens element 360 with negative refractive power has an object-side surface 361 being concave in a paraxial region thereof and an image-side surface 362 being concave in a paraxial region thereof, wherein the image-side surface 362 of the sixth lens element 360 has at least one convex shape in an off-axis region thereof. The sixth lens element 360 is made of plastic material and has the object-side surface 361 and the image-side surface 362 being both aspheric.

The IR-cut filter 380 made of glass material is located between the sixth lens element 360 and the image plane 370, and will not affect a focal length of the photographing lens assembly.

The detailed optical data of the 3rd embodiment are shown in Table 5, and the aspheric surface data are shown in Table 6 below.

TABLE 5

3rd Embodiment
f = 4.42 mm, Fno = 2.42, HFOV = 38.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.914 ASP | 0.574 | Plastic | 1.544 | 55.9 | 3.78 |

TABLE 5-continued

3rd Embodiment
f = 4.42 mm, Fno = 2.42, HFOV = 38.3 deg.

| Surface # | | Curvature Radius | Thickness | Material | Index | Abbe # | Focal Length |
|---|---|---|---|---|---|---|---|
| 2 | | 26.203 ASP | 0.013 | | | | |
| 3 | Ape. Stop | Plano | 0.264 | | | | |
| 4 | Lens 2 | −2.979 ASP | 0.220 | Plastic | 1.634 | 23.8 | −5.03 |
| 5 | | −47.135 ASP | 0.262 | | | | |
| 6 | Lens 3 | 3.227 ASP | 0.626 | Plastic | 1.544 | 55.9 | 6.22 |
| 7 | | 64.706 ASP | 0.107 | | | | |
| 8 | Lens 4 | −6.414 ASP | 0.300 | Plastic | 1.514 | 56.8 | −20.86 |
| 9 | | −16.238 ASP | 0.550 | | | | |
| 10 | Lens 5 | 25.838 ASP | 0.776 | Plastic | 1.544 | 55.9 | 3.45 |
| 11 | | −2.003 ASP | 0.316 | | | | |
| 12 | Lens 6 | −25.289 ASP | 0.500 | Plastic | 1.535 | 55.7 | −2.34 |
| 13 | | 1.329 ASP | 0.600 | | | | |
| 14 | IR-cut filter | Plano | 0.210 | Glass | 1.517 | 64.2 | — |
| 15 | | Plano | 0.217 | | | | |
| 16 | Image | Plano | — | | | | |

Note:
Reference wavelength is 587.6 nm (d-line).

TABLE 6

Aspheric Coefficients

| Surface # | 1 | 2 | 4 | 5 | 6 | 7 |
|---|---|---|---|---|---|---|
| k = | −6.8503E+00 | −3.7546E+01 | −1.4409E+01 | −5.0000E+01 | 4.6422E+00 | 4.9004E+01 |
| A4 = | 1.1204E−01 | 4.1142E−04 | 1.0169E−01 | 1.4380E−01 | −7.3977E−02 | 9.2474E−04 |
| A6 = | −3.3547E−02 | −7.7004E−02 | −1.7595E−01 | −1.3897E−01 | −1.4863E−02 | −1.6225E−01 |
| A8 = | −6.2116E−02 | 2.5136E−01 | 3.9366E−01 | 2.3082E−01 | −8.7932E−02 | 1.1042E−01 |
| A10 = | 1.3080E−01 | −4.6612E−01 | −6.0547E−01 | −2.7695E−01 | 2.2984E−01 | −4.4403E−02 |
| A12 = | −1.1071E−01 | 3.6843E−01 | 4.6452E−01 | 1.8326E−01 | −3.3405E−01 | −6.3209E−04 |
| A14 = | 3.9062E−02 | −7.2636E−02 | −1.0823E−01 | −2.9845E−02 | 2.1881E−01 | 9.0558E−03 |
| A16 = | −7.0609E−03 | −3.7083E−02 | −2.8623E−02 | −1.3780E−02 | −5.0801E−02 | −1.9834E−03 |

| Surface # | 8 | 9 | 10 | 11 | 12 | 13 |
|---|---|---|---|---|---|---|
| k = | −1.0978E−01 | 2.7252E+00 | 5.0000E+01 | −1.1251E+01 | −5.0000E+01 | −6.3068E+00 |
| A4 = | 8.9508E−02 | 4.2670E−02 | 5.2873E−02 | 8.4639E−03 | −1.4059E−01 | −8.1038E−02 |
| A6 = | −3.4288E−01 | −2.2567E−01 | −1.1420E−01 | −8.1964E−02 | −6.7071E−03 | 2.9672E−02 |
| A8 = | 5.6834E−01 | 4.0373E−01 | 7.3910E−02 | 2.6067E−02 | 1.9993E−02 | −7.2830E−03 |
| A10 = | −5.0155E−01 | −3.1449E−01 | −2.6266E−02 | −4.4695E−03 | −2.8739E−03 | 1.1043E−03 |
| A12 = | 2.6049E−01 | 1.2708E−01 | 4.5740E−03 | 8.6850E−04 | −3.3959E−04 | −9.7179E−05 |
| A14 = | −7.3729E−02 | −2.6489E−02 | −1.5887E−04 | −1.8639E−04 | 1.0344E−04 | 4.0098E−06 |
| A16 = | 8.5974E−03 | 2.2408E−03 | −4.9987E−05 | 1.5479E−05 | −6.2305E−06 | −3.7408E−08 |

In the photographing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3nd Embodiment | | | |
|---|---|---|---|
| f [mm] | 4.42 | (R9 + R10)/(R9 − R10) | 0.86 |
| Fno | 2.42 | (R11 + R12)/(R11 − R12) | 0.90 |
| HFOV [deg.] | 38.3 | f/f3 | 0.71 |
| R1/f | 0.43 | f/R4 | −0.09 |
| CT3/CT4 | 2.09 | Sag22/CT2 | 0.39 |
| CT6/T56 | 1.58 | TL/ImgH | 1.58 |
| f3/|f4| | 0.30 | | |

4th Embodiment

Figure 7:
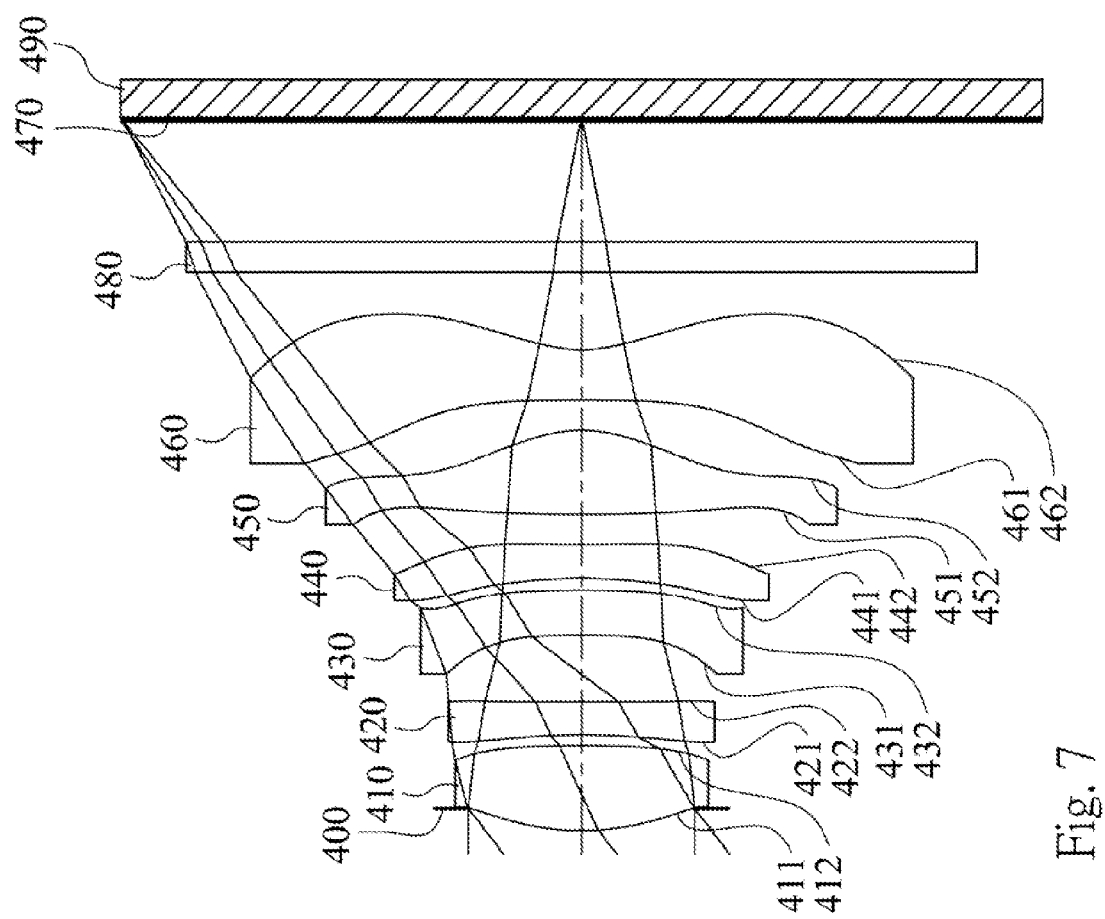
FIG. 7 is a schematic view of an image capturing device according to the 4th embodiment of the present disclosure.
Figure 8:
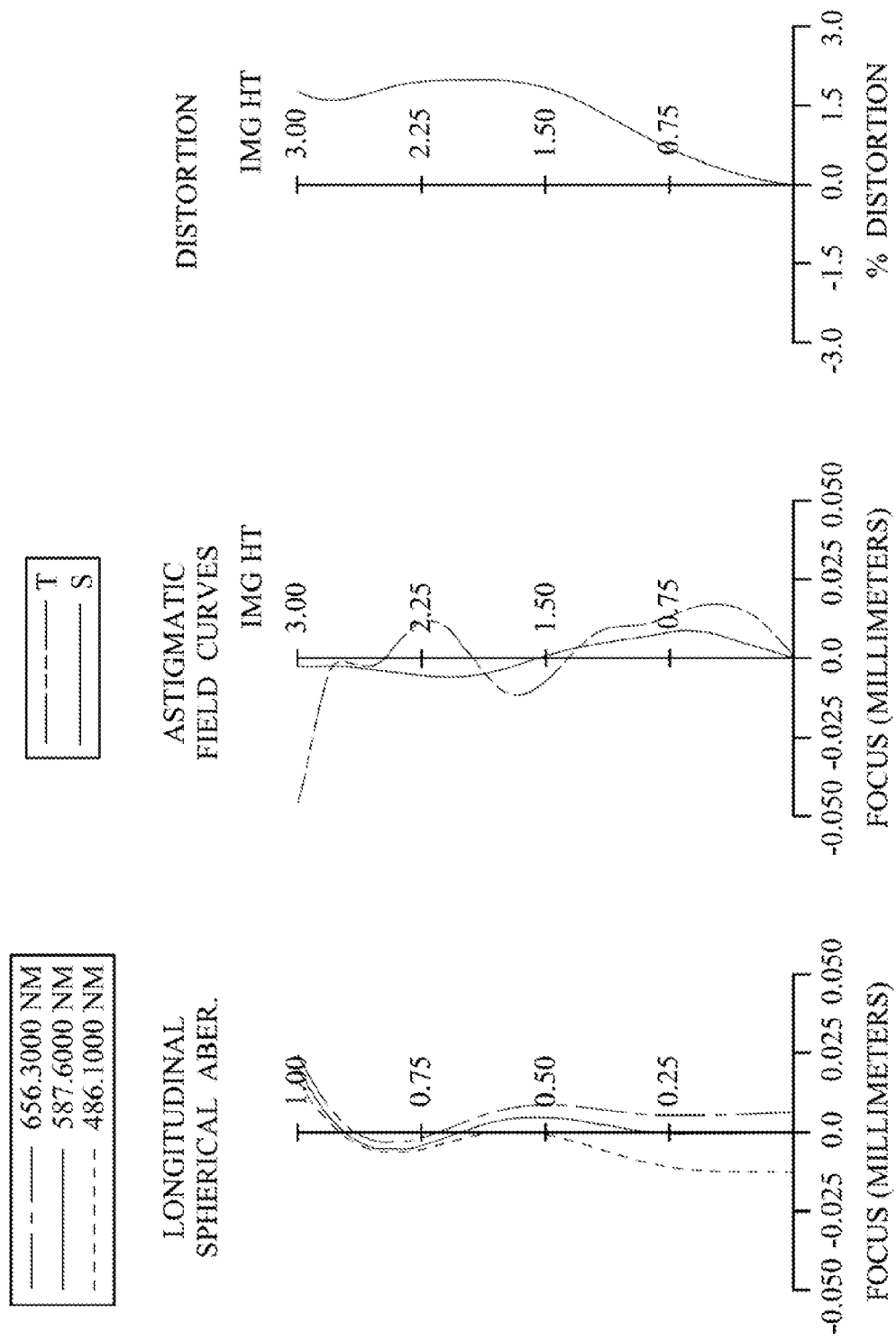
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing lens assembly (not otherwise herein labeled) and an image sensor 490. The photographing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470, wherein the image sensor 490 is disposed on the image plane 470. The photographing lens assembly has a total of six lens elements (410-460) with refractive power.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric, wherein both of the object-side surface 421 and the image-side surface 422 of the second lens element 420 have at least one inflection point in an off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric, wherein the image-side surface 432 of the third lens element 430 has at least one inflection point in an off-axis region thereof.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric, wherein both of the object-side surface 441 and the image-side surface 442 of the fourth lens element 440 have at least one inflection point in an off-axis region thereof.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric, wherein both of the object-side surface 451 and the image-side surface 452 of the fifth lens element 450 have at least one inflection point in an off-axis region thereof.

The sixth lens element 460 with negative refractive power has an object-side surface 461 being concave in a paraxial region thereof and an image-side surface 462 being concave in a paraxial region thereof, wherein the image-side surface 462 of the sixth lens element 460 has at least one convex shape in an off-axis region thereof. The sixth lens element 460 is made of plastic material and has the object-side surface 461 and the image-side surface 462 being both aspheric.

The IR-cut filter 480 made of glass material is located between the sixth lens element 460 and the image plane 470, and will not affect a focal length of the photographing lens assembly.

The detailed optical data of the 4th embodiment are shown in Table 7, and the aspheric surface data are shown in Table 8 below.

TABLE 7

4th Embodiment
f = 3.83 mm, Fno = 2.60, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.144 | | | | |
| 2 | Lens 1 | 1.655 | ASP | 0.551 | Plastic | 1.544 | 55.9 | 2.60 |
| 3 | | −8.692 | ASP | 0.070 | | | | |
| 4 | Lens 2 | −4.142 | ASP | 0.220 | Plastic | 1.639 | 23.5 | −6.77 |
| 5 | | −100.000 | ASP | 0.430 | | | | |
| 6 | Lens 3 | −6.927 | ASP | 0.296 | Plastic | 1.639 | 23.5 | 121.41 |
| 7 | | −6.465 | ASP | 0.077 | | | | |
| 8 | Lens 4 | −3.142 | ASP | 0.220 | Plastic | 1.565 | 42.0 | −4.02 |
| 9 | | 8.394 | ASP | 0.194 | | | | |
| 10 | Lens 5 | 12.907 | ASP | 0.552 | Plastic | 1.544 | 55.9 | 1.50 |
| 11 | | −0.861 | ASP | 0.196 | | | | |
| 12 | Lens 6 | −19.442 | ASP | 0.328 | Plastic | 1.491 | 59.9 | −1.67 |
| 13 | | 0.863 | ASP | 0.500 | | | | |
| 14 | IR-cut filter | Plano | | 0.200 | Glass | 1.517 | 64.2 | — |
| 15 | | Plano | | 0.801 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −4.6642E+00 | 4.8247E+01 | −2.9675E+01 | −5.0000E+01 | −3.0000E+01 | −3.0000E+01 |
| A4 = | 1.0431E−01 | −1.0367E−01 | −2.6802E−02 | 3.2307E−02 | −2.8113E−01 | 1.1900E−01 |
| A6 = | −1.4978E−01 | 8.1727E−02 | 1.3030E−01 | 6.1136E−02 | −7.3353E−02 | −9.1543E−01 |
| A8 = | 2.5833E−01 | −7.8372E−02 | 2.5234E−01 | −1.0166E−01 | −3.7482E−01 | 1.4838E+00 |
| A10 = | −7.2819E−01 | −3.9682E−01 | −1.3015E+00 | −3.0435E−02 | 8.1344E−01 | −1.4537E+00 |
| A12 = | 8.4996E−01 | 7.3662E−01 | 1.7794E+00 | −1.2190E−01 | −4.1322E−01 | 1.0278E+00 |
| A14 = | −4.9201E−01 | −4.0012E−01 | −7.4908E−01 | 1.6330E−01 | | −3.1963E−01 |

TABLE 8-continued

| | Aspheric Coefficients | | | | | |
|---|---|---|---|---|---|---|
| Surface # | 8 | 9 | 10 | 11 | 12 | 13 |
| k = | 2.9999E+00 | −3.0000E+01 | −3.0000E+01 | −4.7087E+00 | 3.1102E+01 | −6.1996E+00 |
| A4 = | 2.5632E−01 | −1.8883E−01 | −9.0309E−03 | −6.1269E−02 | −6.1221E−02 | −1.1851E−01 |
| A6 = | −9.7171E−01 | −4.4818E−02 | 7.7184E−02 | 2.4337E−01 | −7.1634E−02 | 4.9799E−02 |
| A8 = | 1.7229E+00 | 1.8232E−01 | −1.1673E−01 | −1.6652E−01 | 6.4272E−02 | −1.7596E−02 |
| A10 = | −1.6132E+00 | −1.5460E−01 | 7.7390E−02 | 4.8779E−02 | −1.6817E−02 | 4.3323E−03 |
| A12 = | 8.2482E−01 | 5.5134E−02 | −2.8823E−02 | −6.1108E−03 | 1.4565E−03 | −6.6727E−04 |
| A14 = | −1.7698E−01 | −4.3140E−03 | 4.4041E−03 | 1.4988E−04 | −1.6590E−06 | 4.5258E−05 |

In the photographing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 3.83 | (R9 + R10)/(R9 − R10) | 0.87 |
| Fno | 2.60 | (R11 + R12)/(R11 − R12) | 0.91 |
| HFOV [deg.] | 37.6 | f/f3 | 0.03 |
| R1/f | 0.43 | f/R4 | −0.04 |
| CT3/CT4 | 1.35 | Sag22/CT2 | 0.00 |
| CT6/T56 | 1.67 | TL/ImgH | 1.55 |
| f3/|f4| | 30.20 | | |

5th Embodiment

Figure 9:
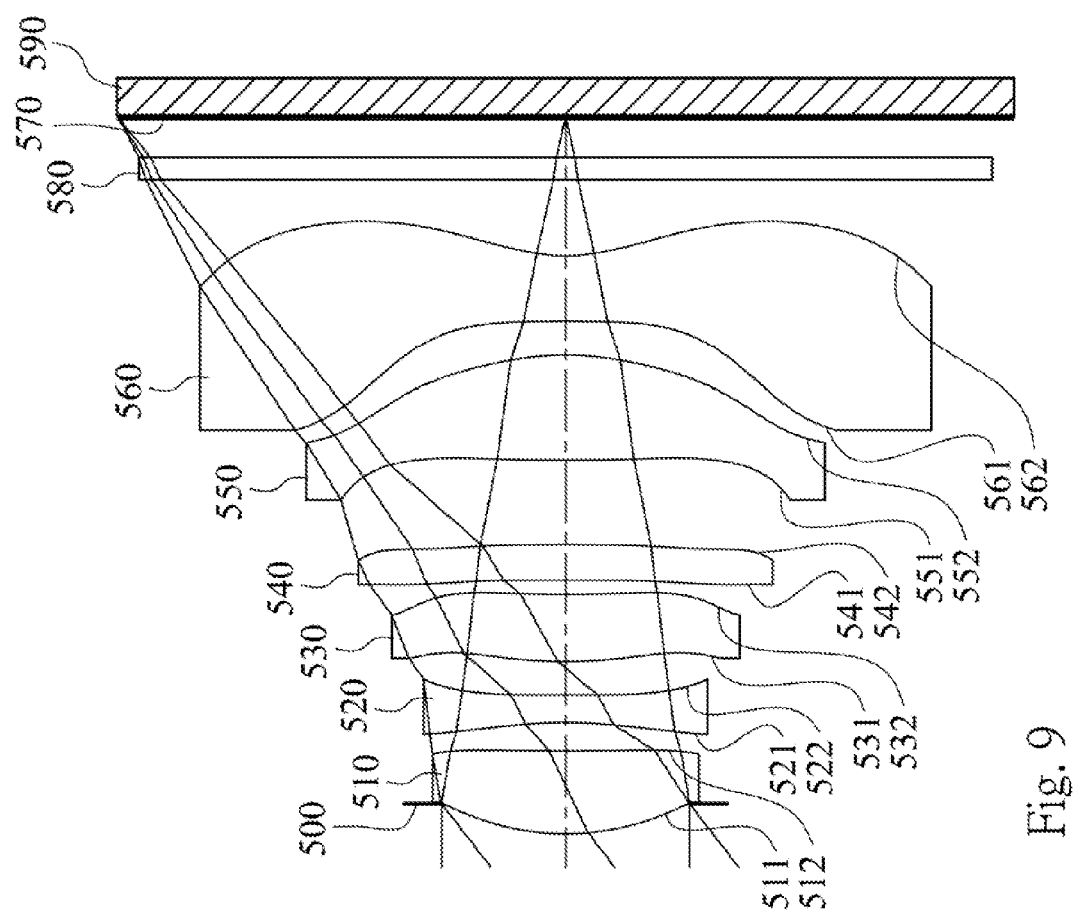
FIG. 9 is a schematic view of an image capturing device according to the 5th embodiment of the present disclosure.
Figure 10:
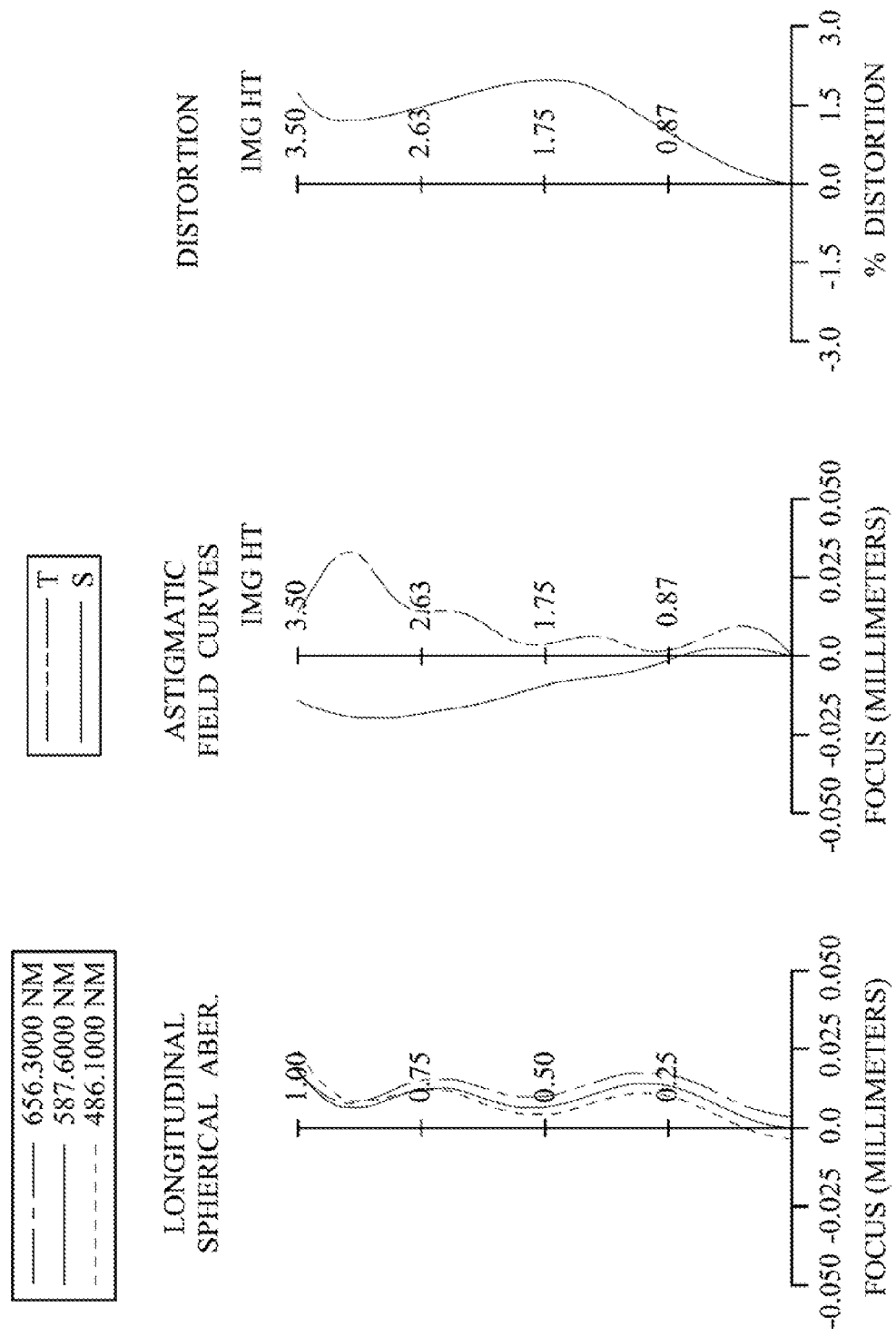
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing lens assembly (not otherwise herein labeled) and an image sensor 590. The photographing lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570, wherein the image sensor 590 is disposed on the image plane 570. The photographing lens assembly has a total of six lens elements (510-560) with refractive power.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric, wherein both of the object-side surface 521 and the image-side surface 522 of the second lens element 520 have at least one inflection point in an off-axis region thereof.

The third lens element 530 with positive refractive power has an object-side surface 531 being convex in a paraxial region thereof and an image-side surface 532 being concave in a paraxial region thereof, wherein the object-side surface 531 of the third lens element 530 has at least one concave shape in an off-axis region thereof. The third lens element 530 is made of plastic material and has the object-side surface 531 and the image-side surface 532 being both aspheric, wherein both of the object-side surface 531 and the image-side surface 532 of the third lens element 530 have at least one inflection point in the off-axis region thereof.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric, wherein both of the object-side surface 541 and the image-side surface 542 of the fourth lens element 540 have at least one inflection point.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric, wherein both of the object-side surface 551 and the image-side surface 552 of the fifth lens element 550 have at least one inflection point.

The sixth lens element 560 with negative refractive power has an object-side surface 561 being concave in a paraxial region thereof and an image-side surface 562 being concave in a paraxial region thereof, wherein the image-side surface 562 of the sixth lens element 560 has at least one convex shape in an off-axis region thereof. The sixth lens element 560 is made of plastic material and has the object-side surface 561 and the image-side surface 562 being both aspheric.

The IR-cut filter 580 made of glass material is located between the sixth lens element 560 and the image plane 570, and will not affect a focal length of the photographing lens assembly.

The detailed optical data of the 5th embodiment are shown in Table 9, and the aspheric surface data are shown in Table 10 below.

TABLE 9

5th Embodiment
f = 4.45 mm, Fno = 2.30, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.236 | | | | |

TABLE 9-continued

5th Embodiment
f = 4.45 mm, Fno = 2.30, HFOV = 37.7 deg.

| Surface # | | Curvature Radius | | Thickness | Material | Index | Abbe # | Focal Length |
|---|---|---|---|---|---|---|---|---|
| 2 | Lens 1 | 1.975 | ASP | 0.648 | Plastic | 1.544 | 55.9 | 3.88 |
| 3 | | 27.165 | ASP | 0.217 | | | | |
| 4 | Lens 2 | −3.102 | ASP | 0.220 | Plastic | 1.634 | 23.8 | −5.26 |
| 5 | | −45.465 | ASP | 0.260 | | | | |
| 6 | Lens 3 | 3.281 | ASP | 0.521 | Plastic | 1.544 | 55.9 | 8.81 |
| 7 | | 9.811 | ASP | 0.112 | | | | |
| 8 | Lens 4 | −46.407 | ASP | 0.281 | Plastic | 1.514 | 56.8 | 228.94 |
| 9 | | −33.342 | ASP | 0.661 | | | | |
| 10 | Lens 5 | 21.250 | ASP | 0.818 | Plastic | 1.544 | 55.9 | 3.40 |
| 11 | | −1.997 | ASP | 0.266 | | | | |
| 12 | Lens 6 | −31.699 | ASP | 0.508 | Plastic | 1.535 | 55.7 | −2.39 |
| 13 | | 1.341 | ASP | 0.600 | | | | |
| 14 | IR-cut filter | Plano | | 0.175 | Glass | 1.517 | 64.2 | — |
| 15 | | Plano | | 0.313 | | | | |
| 16 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | −7.6779E+00 | 5.0000E+01 | −1.5522E+01 | −5.0000E+01 | 4.5268E+00 | 4.9004E+01 |
| A4 = | 1.1211E−01 | −2.0843E−03 | 1.0352E−01 | 1.4329E−01 | −7.8098E−02 | −5.5334E−03 |
| A6 = | −3.8498E−02 | −8.4645E−02 | −1.8090E−01 | −1.4308E−01 | −1.8802E−02 | −1.3283E−01 |
| A8 = | −8.5548E−02 | 2.5695E−01 | 3.8862E−01 | 2.2851E−01 | −6.0713E−02 | 6.7539E−02 |
| A10 = | 1.4783E−01 | −4.6492E−01 | −5.9873E−01 | −2.7801E−01 | 1.4617E−01 | 1.8800E−02 |
| A12 = | −1.2671E−01 | 3.7323E−01 | 4.6235E−01 | 1.8557E−01 | −1.9180E−01 | −6.1843E−02 |
| A14 = | 3.8890E−02 | −1.1598E−01 | −1.3593E−01 | −4.4629E−02 | 1.1044E−01 | 3.7890E−02 |
| A16 = | −1.3813E−03 | 1.8228E−03 | 1.1279E−03 | −1.3029E−03 | −2.1283E−02 | −7.1961E−03 |

| Surface # | 8 | 9 | 10 | 11 | 12 | 13 |
|---|---|---|---|---|---|---|
| k = | −6.3653E−01 | 2.7252E+00 | 2.9834E+01 | −1.2086E+01 | −5.0000E+01 | −5.9304E+00 |
| A4 = | 4.9772E−02 | 3.2916E−03 | 2.7844E−02 | 3.1484E−03 | −2.0726E+00 | −5.7932E−02 |
| A6 = | −2.5885E−01 | −1.4025E−01 | −6.8938E−02 | −3.4035E−02 | −2.0025E+00 | 1.2082E−02 |
| A8 = | 3.9284E−01 | 2.29676E−01 | 4.8584E−02 | 1.2129E−02 | 5.2046E+00 | −8.8396E−04 |
| A10 = | −3.0326E−01 | −1.4430E−01 | −2.7371E−02 | −4.9936E−03 | 3.3379E+00 | −2.0593E−04 |
| A12 = | 1.3283E−01 | 4.0036E−02 | 1.0882E−02 | 2.6515E−03 | −1.0350E+01 | 5.7555E−05 |
| A14 = | −3.1202E−02 | −3.9047E−03 | −2.5185E−03 | −6.1731E−04 | 6.2710E+00 | −5.7336E−06 |
| A16 = | 3.0175E−03 | −1.0658E−04 | 2.3482E−04 | 4.8185E−05 | −1.1841E+00 | 2.1379E−07 |

In the photographing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 4.45 | (R9 + R10)/(R9 − R10) | 0.83 |
| Fno | 2.30 | (R11 + R12)/(R11 − R12) | 0.92 |
| HFOV [deg.] | 37.7 | f/f3 | 0.51 |
| R1/f | 0.44 | f/R4 | −0.10 |
| CT3/CT4 | 1.85 | Sag22/CT2 | 0.56 |
| CT6/T56 | 1.91 | TL/ImgH | 1.60 |
| f3/|f4| | 0.04 | | |

6th Embodiment

Figure 11:
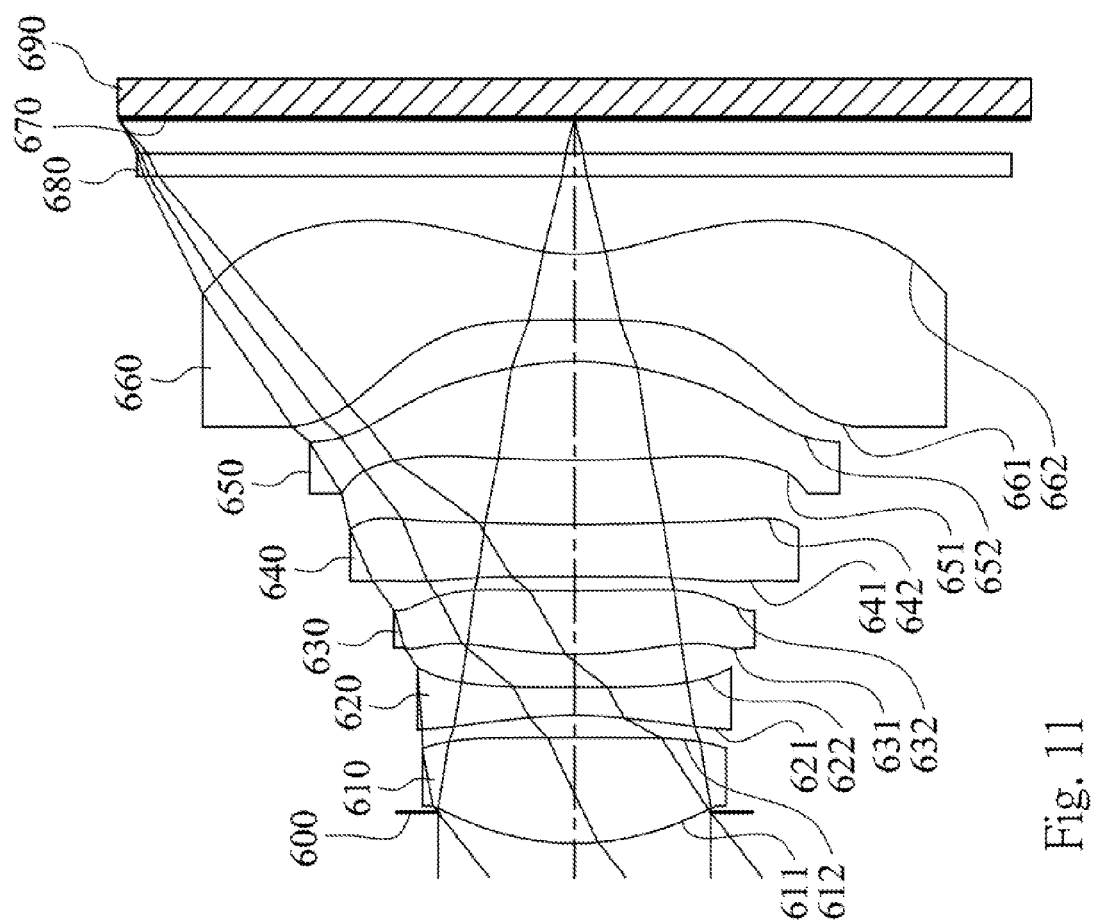
FIG. 11 is a schematic view of an image capturing device according to the 6th embodiment of the present disclosure.
Figure 12:
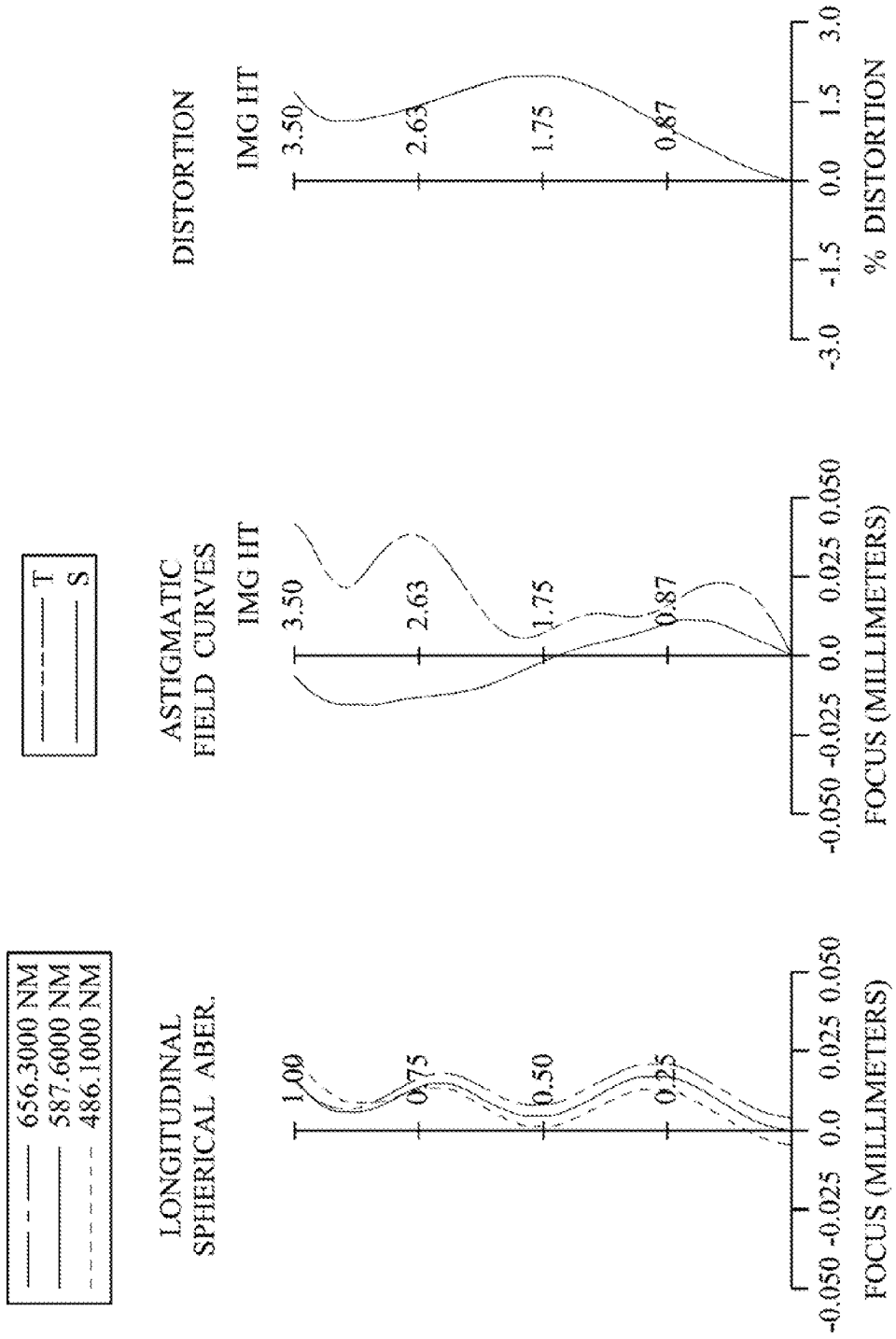
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing lens assembly (not otherwise herein labeled) and an image sensor 690. The photographing lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670, wherein the image sensor 690 is disposed on the image plane 670. The photographing lens assembly has a total of six lens elements (610-660) with refractive power.

The first lens element 610 with positive refractive power has an object-side surface 611 being convex in a paraxial region thereof and an image-side surface 612 being planar in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric, wherein both of the object-side surface 621 and the image-side surface 622 of the second lens element 620 have at least one inflection point in an off-axis region thereof.

The third lens element 630 with positive refractive power has an object-side surface 631 being convex in a paraxial region thereof and an image-side surface 632 being concave in a paraxial region thereof, wherein the object-side surface 631 of the third lens element 630 has at least one concave shape in an off-axis region thereof. The third lens element 630 is made of plastic material and has the object-side surface 631 and the image-side surface 632 being both aspheric, wherein both of the object-side surface 631 and the image-side surface of the third lens element 630 have at least one inflection point in the off-axis region thereof.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric, wherein both of the object-side surface 641 and the image-side surface 642 of the fourth lens element 640 have at least one inflection point in an off-axis region thereof.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric, wherein both of the object-side surface 651 and the image-side surface 652 of the fifth lens element 640 have at least one inflection point in an off-axis region thereof.

The sixth lens element 660 with negative refractive power has an object-side surface 661 being concave in a paraxial region thereof and an image-side surface 662 being concave in a paraxial region thereof, wherein the image-side surface 662 of the sixth lens element 660 has at least one convex shape in an off-axis region thereof. The sixth lens element 660 is made of plastic material and has the object-side surface 661 and the image-side surface 662 being both aspheric.

The IR-cut filter 680 made of glass material is located between the sixth lens element 660 and the image plane 670, and will not affect a focal length of the photographing lens assembly.

The detailed optical data of the 6th embodiment are shown in Table 11, and the aspheric surface data are shown in Table 12 below.

TABLE 11

6th Embodiment
f = 4.35 mm, Fno = 2.08, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.236 | | | | |
| 2 | Lens 1 | 2.059 | ASP | 0.806 | Plastic | 1.544 | 55.9 | 3.78 |
| 3 | | ∞ | ASP | 0.172 | | | | |
| 4 | Lens 2 | −2.966 | ASP | 0.220 | Plastic | 1.634 | 23.8 | −5.18 |
| 5 | | −31.335 | ASP | 0.253 | | | | |
| 6 | Lens 3 | 3.090 | ASP | 0.484 | Plastic | 1.544 | 55.9 | 6.94 |
| 7 | | 16.030 | ASP | 0.112 | | | | |
| 8 | Lens 4 | −38.403 | ASP | 0.400 | Plastic | 1.514 | 56.8 | −17.85 |
| 9 | | 12.062 | ASP | 0.495 | | | | |
| 10 | Lens 5 | 16.169 | ASP | 0.755 | Plastic | 1.544 | 55.9 | 3.19 |
| 11 | | −1.910 | ASP | 0.321 | | | | |
| 12 | Lens 6 | −31.699 | ASP | 0.500 | Plastic | 1.535 | 55.7 | −2.39 |
| 13 | | 1.341 | ASP | 0.600 | | | | |
| 14 | IR-cut filter | Plano | | 0.175 | Glass | 1.517 | 64.2 | — |
| 15 | | Plano | | 0.271 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 8 | 7 |
|---|---|---|---|---|---|---|
| k = | −8.6164E+00 | 0.0000E+00 | −1.4690E+01 | 5.0000E+01 | 3.9570E+00 | 4.9004E+01 |
| A4 = | 1.0885E−01 | −6.3514E−03 | 1.0140E−01 | 1.4171E−01 | −7.6721E−02 | 2.2627E−02 |
| A6 = | −4.0346E−02 | −8.1652E−02 | −1.8221E−01 | −1.4668E−01 | 3.5257E−02 | −1.2069E−01 |
| A8 = | −6.6597E−02 | 2.5515E−01 | 3.8624E−01 | 2.2811E−01 | −2.7423E−01 | −2.1019E−02 |
| A10 = | 1.4820E−01 | −4.6715E−01 | −6.0021E−01 | −2.7931E−01 | 5.3764E−01 | 1.3743E−01 |
| A12 = | −1.2266E−01 | 3.7239E−01 | 4.6104E−01 | 1.8280E−01 | −5.6977E−01 | −1.2486E−01 |

TABLE 12-continued

| Aspheric Coefficients | | | | | |
|---|---|---|---|---|---|
| A14 = | 3.8890E−02 | −1.1499E−01 | −1.3413E−01 | −4.0570E−02 | 2.9315E−01 | 5.0066E−02 |
| A16 = | −2.4059E−03 | 5.5003E−03 | 3.1779E−03 | −2.2698E−03 | −5.6350E−02 | −7.0844E−03 |

| Surface # | 8 | 9 | 10 | 11 | 12 | 13 |
|---|---|---|---|---|---|---|
| k = | −6.3653E−01 | 2.7252E+00 | 5.0000E+01 | −1.2086E+01 | −5.0000E+01 | −5.9304E+00 |
| A4 = | 5.0291E−02 | 5.0809E−03 | 5.0085E−02 | 5.0953E−03 | −1.9504E+00 | −6.3883E−02 |
| A6 = | −1.7620E−01 | −1.1643E−01 | −8.5618E−02 | −2.8583E−02 | −4.2864E+00 | 1.5323E−02 |
| A8 = | 1.6685E−01 | 1.6837E−01 | 4.2312E−02 | 1.5041E−03 | 1.5494E+01 | −1.5424E−03 |
| A10 = | −6.4976E−02 | −1.0539E−01 | −1.1074E−02 | 2.0150E−03 | −1.8638E+01 | −2.1329E−04 |
| A12 = | 1.1581E−02 | 3.4368E−02 | 1.2739E−03 | 6.8917E−04 | 1.5410E+01 | 7.8413E−05 |
| A14 = | −1.3188E−03 | −5.8601E−03 | 6.2323E−05 | −3.7835E−04 | −9.6466E+00 | −8.5128E−06 |
| A16 = | 1.5885E−04 | 4.0437E−04 | −3.6312E−05 | 3.8353E−05 | 2.8646E+00 | 3.3038E−07 |

In the photographing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 4.35 | (R9 + R10)/(R9 − R10) | 0.79 |
| Fno | 2.08 | (R11 + R12)/(R11 − R12) | 0.92 |
| HFOV [deg.] | 38.3 | f/f3 | 0.63 |
| R1/f | 0.47 | f/R4 | −0.14 |
| CT3/CT4 | 1.21 | Sag22/CT2 | 0.70 |
| CT6/T56 | 1.56 | TL/ImgH | 1.59 |
| f3/|f4| | 0.39 | | |

7th Embodiment

Figure 13:
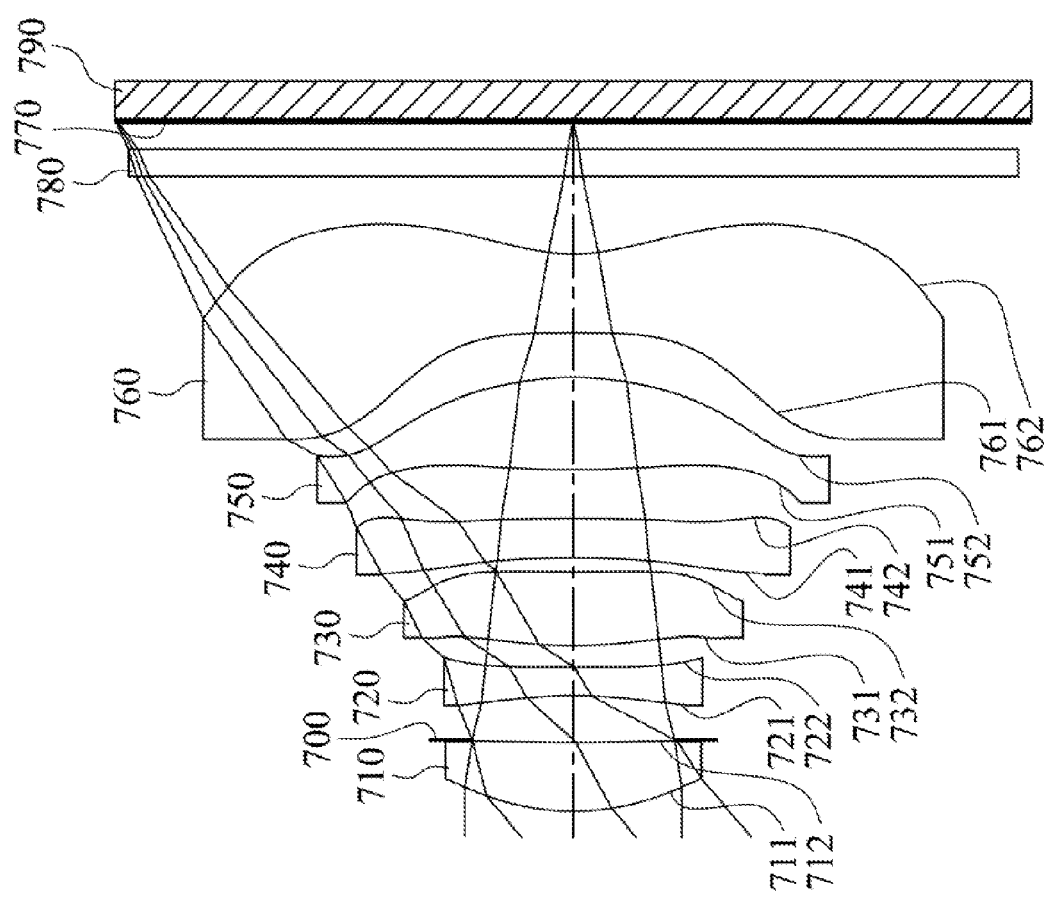
FIG. 13 is a schematic view of an image capturing device according to the 7th embodiment of the present disclosure.
Figure 14:
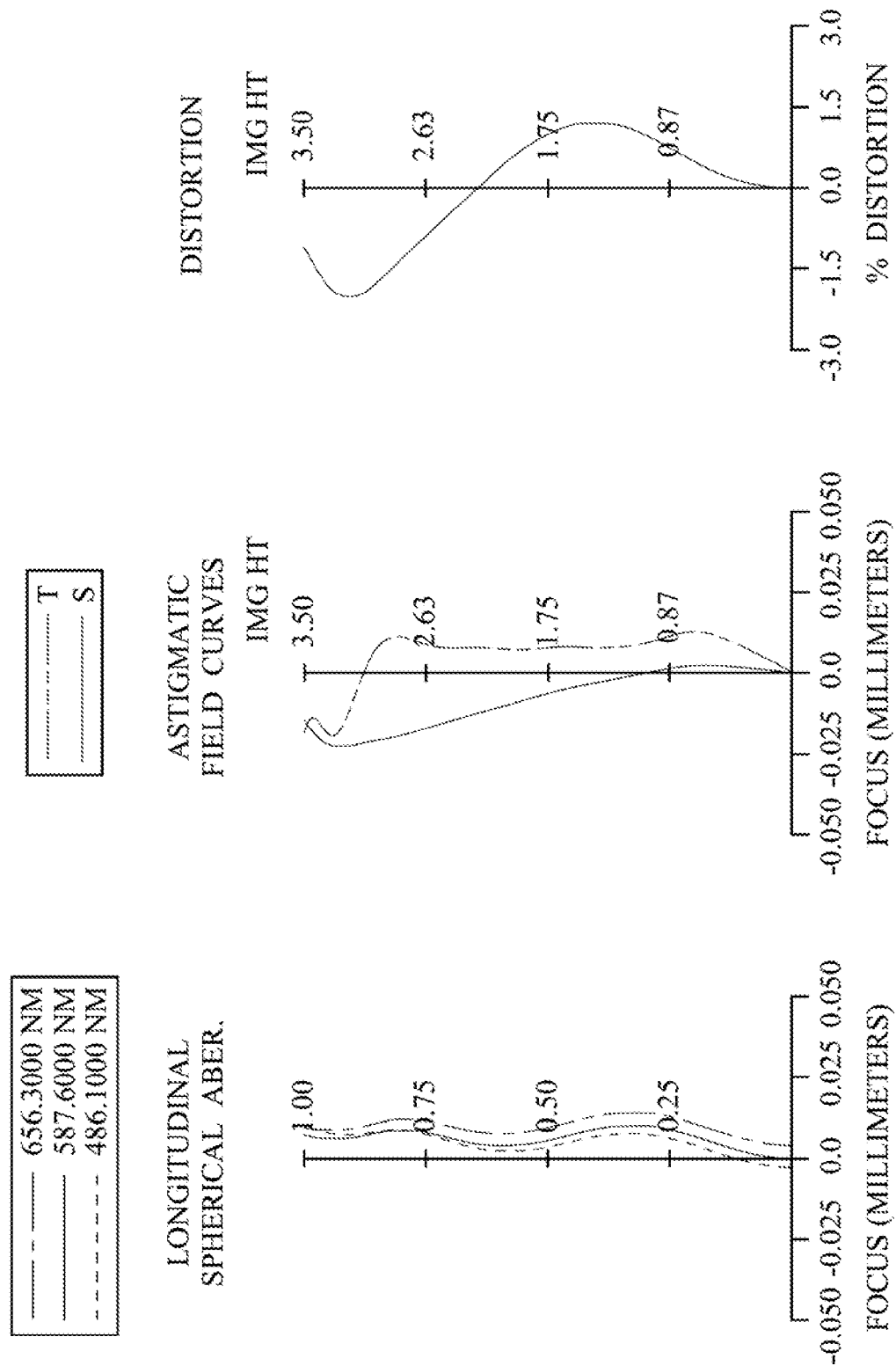
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing lens assembly (not otherwise herein labeled) and an image sensor 790. The photographing lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 780 and an image plane 770, wherein the image sensor 790 is disposed on the image plane 770. The photographing lens assembly has a total of six lens elements (710-760) with refractive power.

The first lens element 710 with positive refractive power has an object-side surface 711 being convex in a paraxial region thereof and an image-side surface 712 being concave in a paraxial region thereof. The first lens element 710 is made of glass material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric, wherein the image-side surface 722 of the second lens element 720 has at least one inflection point in an off-axis region thereof.

The third lens element 730 with positive refractive power has an object-side surface 731 being convex in a paraxial region thereof and an image-side surface 732 being concave in a paraxial region thereof, wherein the object-side surface 731 of the third lens element 730 has at least one concave shape in an off-axis region thereof. The third lens element 730 is made of plastic material and has the object-side surface 731 and the image-side surface 732 being both aspheric, wherein both of the object-side surface 731 and the image-side surface 732 of the third lens element 730 have at least one inflection point in the off-axis region thereof.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric, wherein both of the object-side surface 741 and the image-side surface 742 of the fourth lens element 740 have at least one inflection point in an off-axis region thereof.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric, wherein both of the object-side surface 751 and the image-side surface 752 of the fifth lens element 750 have at least one inflection point in an off-axis region thereof.

The sixth lens element 760 with negative refractive power has an object-side surface 761 being concave in a paraxial region thereof and an image-side surface 762 being concave in a paraxial region thereof, wherein the image-side surface 762 of the sixth lens element 760 has at least one convex shape in an off-axis region thereof. The sixth lens element 760 is made of plastic material and has the object-side surface 761 and the image-side surface 762 being both aspheric.

The IR-cut filter 780 made of glass material is located between the sixth lens element 760 and the image plane 770, and will not affect a focal length of the photographing lens assembly.

The detailed optical data of the 7th embodiment are shown in Table 13, and the aspheric surface data are shown in Table 14 below.

TABLE 13

7th Embodiment
f = 4.17 mm, Fno = 2.51, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.911 | ASP | 0.523 | Glass | 1.542 | 62.9 | 3.95 |
| 2 | | 15.847 | ASP | 0.019 | | | | |
| 3 | Ape. Stop | Plano | | 0.344 | | | | |
| 4 | Lens 2 | −3.149 | ASP | 0.220 | Plastic | 1.639 | 23.5 | −5.68 |
| 5 | | −24.288 | ASP | 0.163 | | | | |
| 6 | Lens 3 | 3.346 | ASP | 0.568 | Plastic | 1.544 | 55.9 | 7.15 |
| 7 | | 22.474 | ASP | 0.107 | | | | |
| 8 | Lens 4 | −7.055 | ASP | 0.300 | Plastic | 1.514 | 56.8 | −22.34 |
| 9 | | −18.586 | ASP | 0.377 | | | | |
| 10 | Lens 5 | 12.998 | ASP | 0.704 | Plastic | 1.544 | 55.9 | 3.35 |
| 11 | | −2.080 | ASP | 0.343 | | | | |
| 12 | Lens 6 | −25.289 | ASP | 0.600 | Plastic | 1.535 | 55.7 | −2.44 |
| 13 | | 1.385 | ASP | 0.600 | | | | |
| 14 | IR-cut filter | Plano | | 0.210 | Glass | 1.517 | 64.2 | — |
| 15 | | Plano | | 0.216 | | | | |
| 16 | Image | Plano | | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | −6.6488E+00 | −5.0000E+01 | −1.5879E+01 | −9.3905E+00 | 5.3383E+00 | 4.9004E+01 |
| A4 = | 1.0818E−01 | −2.6761E−03 | 1.0105E−01 | 1.4293E−01 | −8.9683E−02 | −3.3068E−02 |
| A6 = | −3.7185E−02 | −8.0264E−02 | −1.8312E−01 | −1.3720E−01 | 2.5138E−02 | −3.9538E−02 |
| A8 = | −5.9644E−02 | 2.4086E−01 | 3.8740E−01 | 2.3025E−01 | −2.2385E−01 | −1.1142E−01 |
| A10 = | 1.2971E−01 | −4.6822E−01 | −6.0997E−01 | −2.7996E−01 | 5.2443E−01 | 1.5886E−01 |
| A12 = | −1.1721E−01 | 3.7458E−01 | 4.6568E−01 | 1.8059E−01 | −6.8589E−01 | −9.9176E−02 |
| A14 = | 3.9062E−02 | −6.7257E−02 | −1.0021E−01 | −3.3333E−02 | 4.3564E−01 | 2.9434E−02 |
| A16 = | −7.1024E−03 | −4.7110E−02 | −3.1033E−02 | −7.4208E−03 | −1.0212E−01 | −1.7119E−03 |

| Surface # | 8 | 9 | 10 | 11 | 12 | 13 |
|---|---|---|---|---|---|---|
| k = | −1.0978E−01 | 2.7252E+00 | 2.3826E+01 | −1.0831E+01 | −5.0000E+01 | −6.3068E+00 |
| A4 = | 4.8224E−02 | 6.1337E−02 | 8.6038E−02 | 6.3470E−03 | −1.6231E−01 | −7.6111E−02 |
| A6 = | −2.3583E−01 | −3.1594E−01 | −1.9908E−01 | −7.1768E−02 | −1.0414E−02 | 2.4630E−02 |
| A8 = | 4.0917E−01 | 5.3375E−01 | 1.6825E−01 | 3.7874E−02 | 2.5919E−02 | −5.2396E−03 |
| A10 = | −3.9422E−01 | −4.1335E−01 | −8.8805E−02 | −1.1981E−02 | −3.4446E−03 | 6.0354E−04 |
| A12 = | 2.2889E−01 | 1.6982E−01 | 2.9708E−02 | 4.0420E−03 | −7.5817E−04 | −2.0972E−05 |
| A14 = | −7.2012E−02 | −3.6339E−02 | −5.8726E−03 | −8.6732E−04 | 2.0647E−04 | −2.7343E−06 |
| A16 = | 9.1979E−03 | 3.1717E−03 | 5.1123E−04 | 6.9938E−05 | −1.3013E−05 | 2.2063E−07 |

In the photographing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 4.17 | (R9 + R10)/(R9 − R10) | 0.72 |
| Fno | 2.51 | (R11 + R12)/(R11 − R12) | 0.90 |
| HFOV [deg.] | 40.3 | f/f3 | 0.58 |
| R1/f | 0.46 | f/R4 | −0.17 |
| CT3/CT4 | 1.89 | Sag22/CT2 | 0.33 |
| CT6/T56 | 1.75 | TL/ImgH | 1.51 |
| f3/|f4| | 0.32 | | |

8th Embodiment

Figure 15:
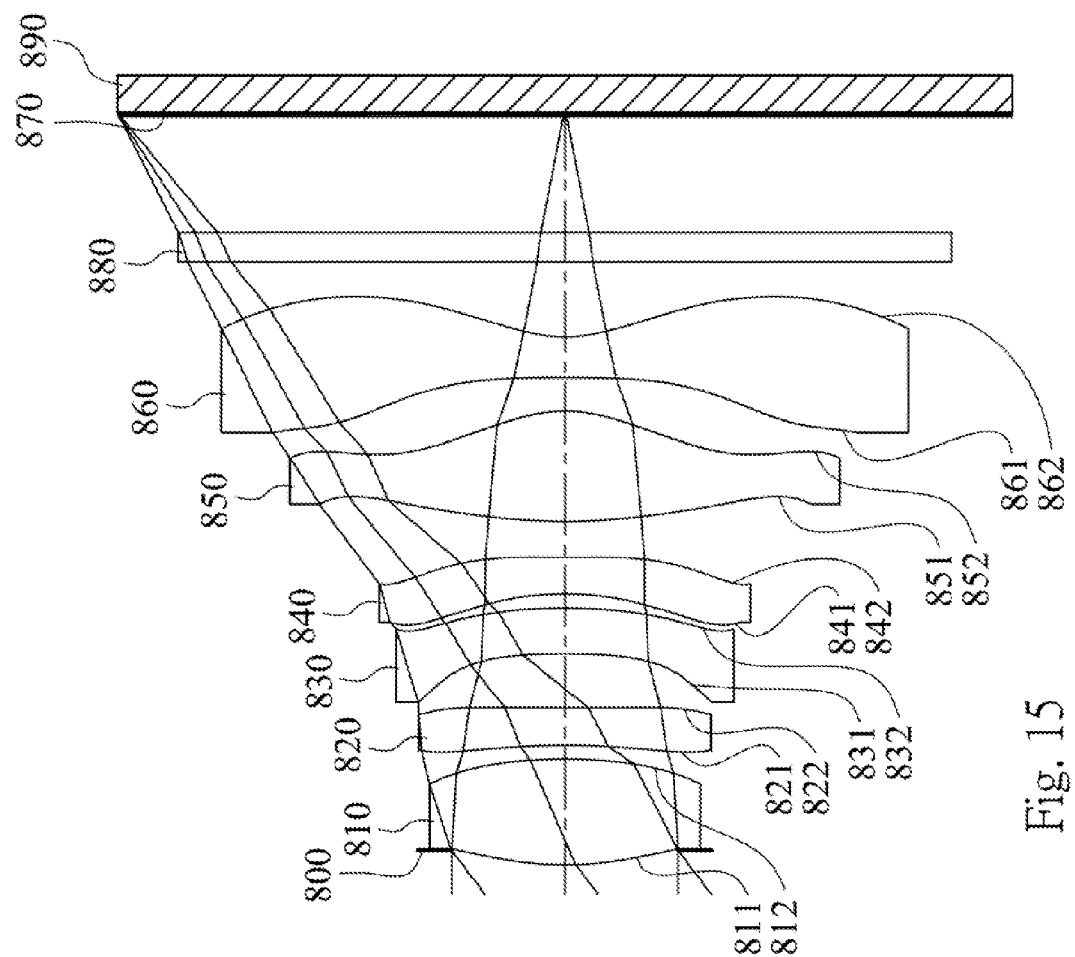
FIG. 15 is a schematic view of an image capturing device according to the 8th embodiment of the present disclosure.
Figure 16:
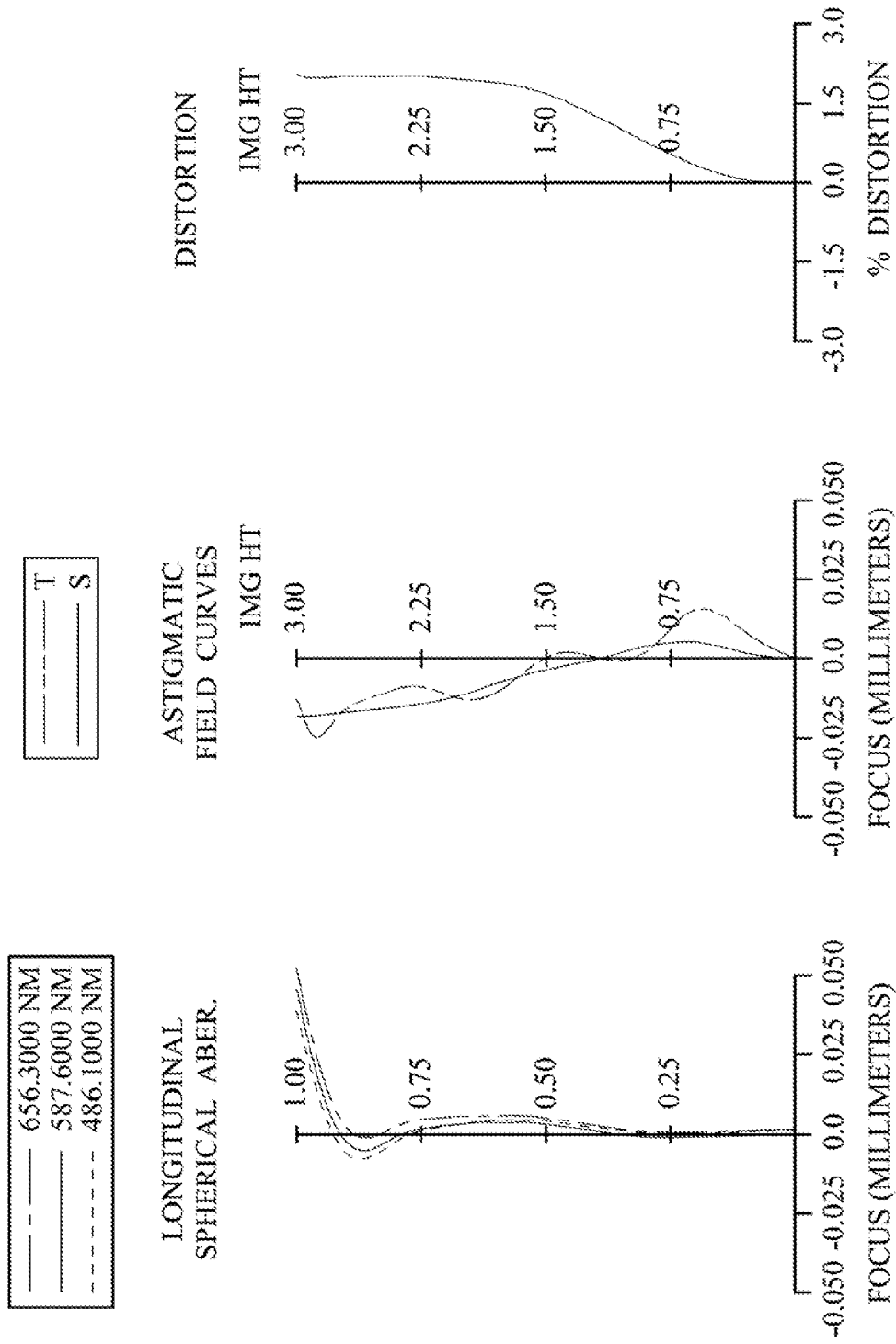
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a photographing lens assembly (not otherwise herein labeled) and an image sensor 890. The photographing lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 880 and an image plane 870, wherein the image sensor 890 is disposed on the image plane 870. The photographing lens assembly has a total of six lens elements (810-860) with refractive power.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric, wherein both of the object-side surface 821 and the image-side surface 822 of the second lens element 820 have at least one inflection point in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric, wherein both of the object-side surface 831 and the image-side surface 832 of the third lens element 830 have at least one inflection point in an off-axis region thereof.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric, wherein both of the object-side surface 841 and the image-side surface 842 of the fourth lens element 840 have at least one inflection point in an off-axis region thereof.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric, wherein both of the object-side surface 851 and the image-side surface 852 of the fifth lens element 850 have at least one inflection point in an off-axis region thereof.

The sixth lens element 860 with negative refractive power has an object-side surface 861 being concave in a paraxial region thereof and an image-side surface 862 being concave in a paraxial region thereof, wherein the image-side surface 862 of the sixth lens element 860 has at least one convex shape in an off-axis region thereof. The sixth lens element 860 is made of plastic material and has the object-side surface 861 and the image-side surface 862 being both aspheric.

The IR-cut filter 880 made of glass material is located between the sixth lens element 860 and the image plane 870, and will not affect a focal length of the photographing lens assembly.

The detailed optical data of the 8th embodiment are shown in Table 15, and the aspheric surface data are shown in Table 16 below.

TABLE 15

8th Embodiment
f = 1.95 mm, Fno = 2.60, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.097 | | | | |
| 2 | Lens 1 | 2.265 | ASP | 0.709 | Plastic | 1.544 | 55.9 | 2.68 |
| 3 | | −3.656 | ASP | 0.093 | | | | |
| 4 | Lens 2 | −4.380 | ASP | 0.250 | Plastic | 1.634 | 23.8 | −7.19 |
| 5 | | −113.015 | ASP | 0.366 | | | | |
| 6 | Lens 3 | −5.037 | ASP | 0.301 | Plastic | 1.650 | 21.4 | 51.74 |
| 7 | | −4.483 | ASP | 0.095 | | | | |
| 8 | Lens 4 | −2.472 | ASP | 0.250 | Plastic | 1.583 | 30.2 | −3.51 |
| 9 | | 12.411 | ASP | 0.242 | | | | |
| 10 | Lens 5 | 3.540 | ASP | 0.741 | Plastic | 1.544 | 55.9 | 1.44 |
| 11 | | −0.931 | ASP | 0.222 | | | | |
| 12 | Lens 6 | −10.682 | ASP | 0.275 | Plastic | 1.535 | 55.7 | −1.51 |
| 13 | | 0.884 | ASP | 0.500 | | | | |
| 14 | IR-cut filter | Plano | | 0.200 | Glass | 1.517 | 64.2 | — |
| 15 | | Plano | | 0.796 | | | | |
| 16 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | −1.1895E+01 | 6.1696E+00 | −4.9996E+01 | −5.0000E+01 | −3.0000E+01 | −3.0000E+01 |
| A4 = | 7.9493E−02 | −6.5939E−02 | −1.3344E−02 | 1.6818E−02 | −2.1872E−01 | −1.9076E−01 |
| A6 = | −1.4817E−01 | 1.0348E−01 | 9.1778E−02 | 1.5044E−02 | −7.0819E−02 | 1.6465E−01 |
| A8 = | 1.9525E−01 | −1.4982E−01 | 2.5983E−01 | −9.0453E−02 | 1.9936E−01 | 4.0707E−01 |
| A10 = | −5.8655E−01 | −2.9076E−01 | −1.3196E+00 | −2.4252E−02 | −6.4251E−01 | −1.2062E+00 |
| A12 = | 8.4996E−01 | 7.3662E−01 | 1.7794E+00 | −1.2190E−01 | 4.7363E−01 | 1.0798E+00 |
| A14 = | −4.9201E−01 | −4.0012E−01 | −7.4908E−01 | 1.6330E−01 | | −3.1333E−01 |

TABLE 16-continued

| Aspheric Coefficients | | | | | | |
|---|---|---|---|---|---|---|
| Surface # | 8 | 9 | 10 | 11 | 12 | 13 |
| k = | 2.4000E+00 | −3.0000E+01 | −3.0000E+01 | −4.8623E+00 | −4.9726E+01 | −6.1622E+00 |
| A4 = | −3.5728E−01 | −4.5884E−01 | −2.5067E−02 | 3.1043E−02 | −4.8450E−02 | −9.2337E−02 |
| A6 = | 1.0077E+00 | 7.8157E−01 | 7.8585E−02 | 3.4345E−02 | −6.0205E−02 | 3.2651E−02 |
| A8 = | −9.7703E−01 | −1.0607E+00 | −7.8123E−02 | −4.9436E−03 | 5.4247E−02 | −7.9584E−03 |
| A10 = | 3.2603E−01 | 8.6798E−01 | 3.9180E−02 | −6.1577E−03 | −1.4907E−02 | 1.2797E−03 |
| A12 = | 1.1039E−01 | −3.6541E−01 | −1.0744E−02 | 2.1464E−03 | 1.6214E−03 | −1.3060E−04 |
| A14 = | −6.5749E−02 | 6.4054E−02 | 1.1863E−03 | −2.2027E−04 | −5.3094E−05 | 6.4487E−06 |

In the photographing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 3.95 | (R9 + R10)/(R9 − R10) | 0.58 |
| Fno | 2.60 | (R11 + R12)/(R11 − R12) | 0.85 |
| HFOV [deg.] | 36.6 | f/f3 | 0.08 |
| R1/f | 0.57 | f/R4 | −0.03 |
| CT3/CT4 | 1.20 | Sag22/CT2 | −0.18 |
| CT6/T56 | 1.24 | TL/ImgH | 1.68 |
| f3/|f4| | 14.74 | | |

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising, in order from an object side to an image side:
a first lens element having positive refractive power;
a second lens element having negative refractive power;
a third lens element having positive refractive power;
a fourth lens element with refractive power having an object-side surface being concave in a paraxial region thereof;
a fifth lens element with positive refractive power having an object-side surface being convex in a paraxial region thereof and an image-side surface being convex in a paraxial region thereof; and
a sixth lens element with refractive power having an image-side surface being concave in a paraxial region thereof, wherein the image-side surface of the sixth lens element has at least one convex shape in an off-axis region thereof, and an object side surface and the image-side surface of the sixth lens element are aspheric;
wherein the photographing lens assembly has a total of six lens elements with refractive power, a focal length of the photographing lens assembly is f, a curvature radius of an image-side surface of the second lens element is R4, and the following condition is satisfied:

−1.0<f/R4≤0.

2. The photographing lens assembly of claim 1, wherein a curvature radius of an object-side surface of the first lens element is R1, the focal length of the photographing lens assembly is f, and the following condition is satisfied:

0.25<R1/f<1.0.

3. The photographing lens assembly of claim 2, wherein the third lens element has an object-side surface being convex in a paraxial region thereof, and the object-side surface of the third lens element has at least one concave shape in an off-axis region thereof.

4. The photographing lens assembly of claim 2, wherein a curvature radius of the object-side surface of the sixth lens element is R11, a curvature radius of the image-side surface of the sixth lens element is R12, and the following condition is satisfied:

0<(R11+R12)/(R11−R12)<2.0.

5. The photographing lens assembly of claim 2, wherein the fourth lens element has negative refractive power.

6. The photographing lens assembly of claim 2, wherein a central thickness of the third lens element is CT3, a central thickness of the fourth lens element is CT4, and the following condition is satisfied:

1.0<CT3/CT4<3.0.

7. The photographing lens assembly of claim 1, wherein a curvature radius of the object-side surface of the fifth lens element is R9, a curvature radius of the image-side surface of the fifth lens element is R10, and the following condition is satisfied:

0.2<(R9+R10)/(R9−R10)<1.0.

8. The photographing lens assembly of claim 7, wherein a focal length of the third lens element is f3, a focal length of the fourth lens element is f4, and the following condition is satisfied:

0<f3/|f4|<0.75.

9. The photographing lens assembly of claim 7, wherein a distance in parallel with an optical axis from an axial vertex on the image-side surface of the second lens element to a maximum effective diameter position on the image-side surface of the second lens element is SAG22, a central thickness of the second lens element is CT2, and the following condition is satisfied:

−0.5<SAG22/CT2<1.0.

10. The photographing lens assembly of claim 7, wherein an axial distance between an object-side surface of the first lens element and an image plane is TL, a maximum image height of the photographing lens assembly is ImgH, and the following condition is satisfied:

TL/ImgH<2.0.

11. The photographing lens assembly of claim 7, wherein the focal length of the photographing lens assembly is f, a focal length of the third lens element is f3, and the following condition is satisfied':

0.3<f/f3.

12. The photographing lens assembly of claim 7, wherein a central thickness of the sixth lens element is CT6, an axial distance between the fifth lens element and the sixth lens element is T56, and the following condition is satisfied:

0.75<CT6/T56<3.0

13. The photographing lens assembly of claim 1, wherein at least one of the object-side surface and the image-side surface of each of the second through the fifth lens elements has at least one inflection point in an off-axis region thereof.

14. The photographing lens assembly of claim 13, wherein an f-number of the photographing lens assembly is Fno, and the following condition is satisfied:

1.5<Fno<2.6.

15. An image capturing device, comprising:
the photographing lens assembly of claim 1; and
an image sensor, wherein the image sensor is located on an image plane of the photographing lens assembly.

16. A photographing lens assembly comprising, in order from an object side to an image side:
a first lens element having positive refractive power;
a second lens element having negative reactive power;
a third lens element having positive refractive power;
a fourth lens element having refractive power;
a fifth lens element with positive refractive power having an object-side surface being convex in a paraxial region thereof and an image-side surface being convex in a paraxial region thereof; and
a sixth lens element with refractive power having an image-side surface being concave in a paraxial region thereof, wherein the image-side surface of the sixth lens element has at least one convex shape in an off-axis region thereof, and an object-side surface and the image-side surface of the sixth lens element are aspheric;
wherein the photographing lens assembly has a total of six lens elements with refractive power, a focal length of the photographing lens assembly is f, a curvature radius of an image-side surface of the second lens element is R4, a central thickness of the third lens element CT3, a central thickness of the fourth lens element is CT4, and the following conditions are satisfied:

−1.0<f/R4≤0; and 0.9<CT3/CT4<5.0.

17. The photographing lens assembly of claim 16, wherein the second lens element has an object-side surface being concave in a paraxial region thereof.

18. The photographing lens assembly of claim 17, wherein the central thickness of the third lens element is CT3, the central thickness of the fourth lens element is CT4, and the following condition is satisfied:

1.0<CT3/CT4<3.0.

19. The photographing lens assembly of claim 17, wherein the focal length of the photographing lens assembly is f, a focal length of the third lens element is f3, and the following condition is satisfied:

0.4<f/f3≤1.2.

20. The photographing lens assembly of claim 17, wherein a focal length of the third lens element is f3, a focal length of the fourth lens element is f4, and the following condition is satisfied:

0<f3/|f4|<0.75.

21. The photographing lens assembly of claim 16, wherein a curvature radius of the object-side surface of the sixth lens element is R11, a curvature radius of the image-side surface of the sixth lens element is R12, and the following condition is satisfied:

0<(R11+R12)/(R11−R12)<2.0.

22. The photographing lens assembly of claim 21, wherein a central thickness of the sixth lens element is CT6, an axial distance between the fifth lens element and the sixth lens element is T56, and the following condition is satisfied:

0.75<CT6/T56<3.0.

23. The photographing lens assembly of claim 16, wherein at least one of the object-side surface and the image-side surface of each of the second through the fifth lens elements has at least one inflection point in an off-axis region thereof.

24. An image capturing device, comprising:
the photographing lens assembly of claim 16; and
an image sensor, wherein the image sensor is located on an image plane of the photographing lens assembly.

* * * * *

UNITED STATES PATENT AND TRADEMARK OFFICE
CERTIFICATE OF CORRECTION

PATENT NO. : 9,140,878 B2
APPLICATION NO. : 14/045800
DATED : September 22, 2015
INVENTOR(S) : Wei-Yu Chen Page 1 of 1

It is certified that error appears in the above-identified patent and that said Letters Patent is hereby corrected as shown below:

IN THE CLAIMS (1) In column 32, line 23, Claim 2 of the issued patent reads as "$0.25 < R/1f < 1.0$", but it should read as "$0.25 < R1/f < 1.0$".

(2) In column 34, line 21, Claim 19 of the issued patent reads as "$0.4 < f/f3 \leqq 1.2$", but it should read as "$0.4 < f/f3 < 1.2$".

Signed and Sealed this
Fifteenth Day of March, 2016

Michelle K. Lee
*Director of the United States Patent and Trademark Office*